US012583160B2

(12) United States Patent　(10) Patent No.:　US 12,583,160 B2

Hotta et al.　(45) Date of Patent:　Mar. 24, 2026

(54) CONTROL DEVICE OF INJECTION MOLDING MACHINE AND INJECTION MOLDING MACHINE

(71) Applicant: SUMITOMO HEAVY INDUSTRIES, LTD., Tokyo (JP)

(72) Inventors: Daigo Hotta, Chiba (JP); Hajime Ono, Chiba (JP); Naoki Kitaguchi, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 64 days.

(21) Appl. No.: 18/500,409

(22) Filed: Nov. 2, 2023

(65) Prior Publication Data

US 2024/0208125 A1　Jun. 27, 2024

(30) Foreign Application Priority Data

Dec. 21, 2022　(JP) ................................. 2022-204728

(51) Int. Cl.
*B29C 45/76*　(2006.01)

(52) U.S. Cl.
CPC ...... *B29C 45/7626* (2013.01); *B29C 45/7653* (2013.01); *B29C 2945/76568* (2013.01); *B29C 2945/76709* (2013.01); *B29C 2945/76725* (2013.01)

(58) Field of Classification Search
CPC ............ B29C 45/7626; B29C 45/1756; B29C 45/2675; B29C 45/2673
See application file for complete search history.

(56) References Cited

U.S. PATENT DOCUMENTS

| | | | |
|---|---|---|---|
| 5,658,600 A | 8/1997 | Okada et al. | |
| 2002/0074676 A1* | 6/2002 | Kachnic | B29C 45/7626 |
| | | | 425/139 |
| 2011/0115117 A1* | 5/2011 | Desmith | B29C 44/428 |
| | | | 425/192 R |
| 2013/0259962 A1* | 10/2013 | Sato | B29C 45/80 |
| | | | 425/150 |
| 2018/0133786 A1* | 5/2018 | Amezawa | B22D 17/32 |
| 2022/0050589 A1* | 2/2022 | Nishizawa | G06F 3/0488 |
| 2024/0198569 A1* | 6/2024 | Susa | B29C 45/20 |

FOREIGN PATENT DOCUMENTS

| | | |
|---|---|---|
| JP | H05-154847 | 6/1993 |
| JP | 2011-136512 | 7/2011 |
| JP | 2019-177535 | 10/2019 |
| JP | 2021084413 | * 6/2021 |

OTHER PUBLICATIONS

JP2021084413 machine translation (Year: 2021).*

* cited by examiner

*Primary Examiner* — Alison L Hindenlang
*Assistant Examiner* — Alexander A Wang
(74) *Attorney, Agent, or Firm* — IPUSA, PLLC

(57) ABSTRACT

A control device controls an operation of an injection molding machine that advances and retracts an ejector rod of an ejector unit. The control device is configured to set a plurality of operation modes including a first operation mode and a second operation mode in which the injection molding machine is operated. The control device sets, at different positions from each other, a first retraction position where the ejection rod retracts to and waits in the first operation mode and a second retraction position where the ejection rod retracts to and waits in the second operation mode.

18 Claims, 10 Drawing Sheets

FIG.4

| 763 | PREPARATION MODE BUTTON |
| 764 | OFF BUTTON |
| 765 | SEMI-AUTOMATIC MODE BUTTON |
| 766 | MANUAL MODE BUTTON |
| 767 | FULLY AUTOMATIC MODE BUTTON |

CONTROL DEVICE OF INJECTION MOLDING MACHINE AND INJECTION MOLDING MACHINE

CROSS-REFERENCE TO RELATED APPLICATION

The present application is based on and claims priority under 35 U.S.C. § 119 to Japanese Patent Application No. 2022-204728, filed on Dec. 21, 2022, the contents of which are incorporated herein by reference in their entirety.

BACKGROUND

Technical Field

The present disclosure relates to a control device of an injection molding machine and an injection molding machine.

Description of Related Art

The related art discloses an ejector control unit for controlling an ejector unit for ejecting and taking out a molding product molded by an injection molding machine. The ejector control unit detects and stores the position of the ejector after mold closing, and controls the operation of the servomotor for the ejector according to the stored ejector retraction end position (retraction position).

The injection molding machine usually sets the retraction position of the ejector rod so that the ejector rod protrudes from the front end surface (punch face) of the movable platen to the stationary platen side. As a result, the moving distance of the ejector rod becomes shorter during the cycle operation of injection molding.

SUMMARY

According to an aspect of the present disclosure, there is provided a control device that controls an operation of an injection molding machine that advances and retracts an ejector rod of an ejector unit. The control device is configured to set a plurality of operation modes including a first operation mode and a second operation mode in which the injection molding machine is operated. The control device sets, at different positions from each other, a first retraction position where the ejection rod retracts to and waits in the first operation mode and a second retraction position where the ejection rod retracts to and waits in the second operation mode.

BRIEF DESCRIPTION OF THE DRAWINGS

FIG. 4 is a diagram illustrating an example of a process of a molding cycle;

FIG. 9A is a diagram illustrating a state in which the ejector rod is arranged at the second retraction position in the injection molding mode;

FIG. 9B is a diagram illustrating a state in which the ejector rod is moved in an injection molding mode.

DETAILED DESCRIPTION

Figure 1:
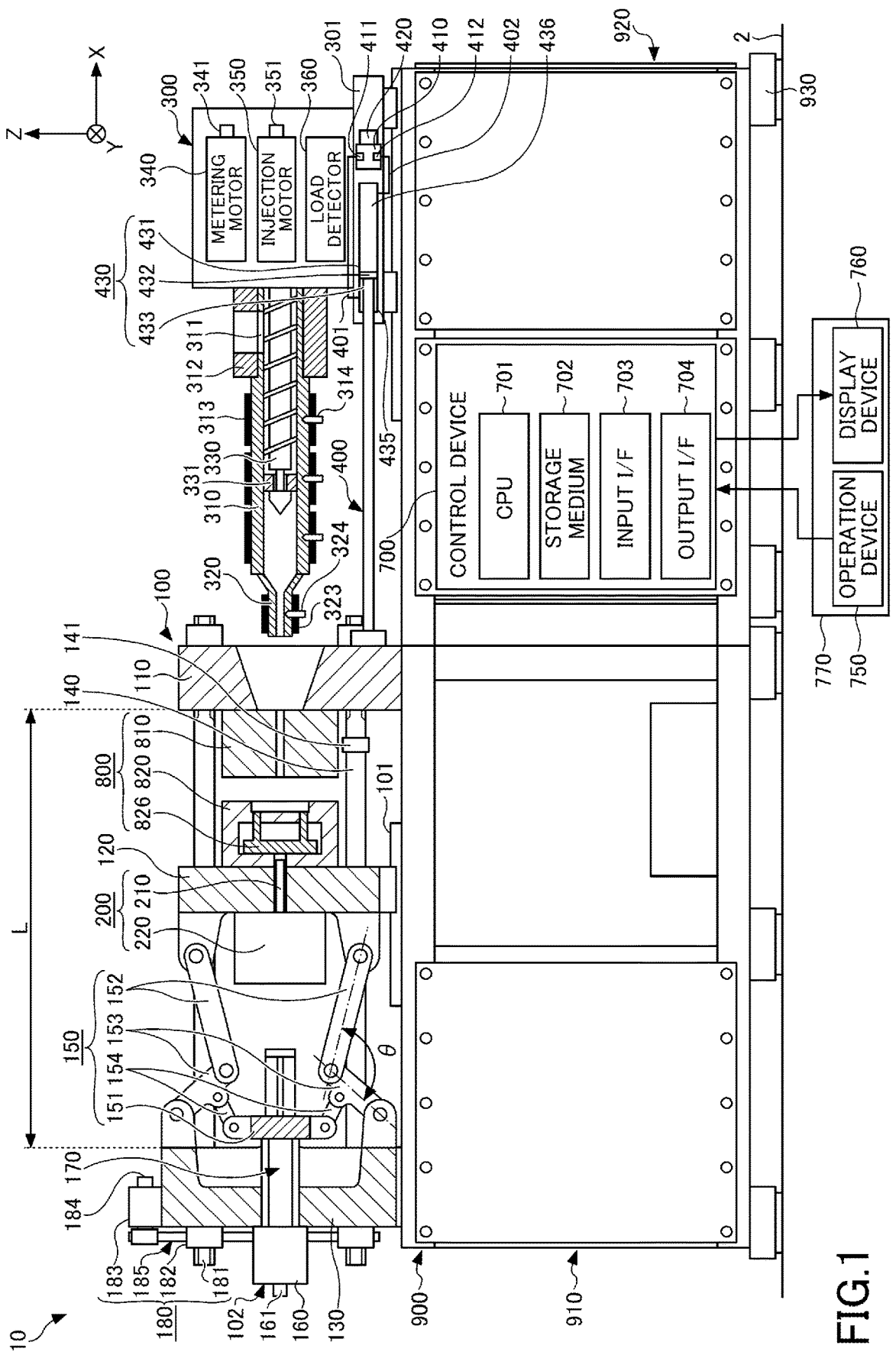
FIG. 1 is a diagram illustrating a state of an injection molding machine according to an embodiment when mold opening is completed.

According to the above-described related-art technique, there is a risk of interference between the ejector rod and the mold unit in the operation of removing the mold unit from the mold clamping unit (stationary platen, movable platen) when the retraction position set in the ejector unit is protruded from the front end surface.

An aspect of the present invention provides a technique for performing various operations of an injection molding machine in a favorable manner, by arranging the ejector rod at an appropriate position.

According to an embodiment of the present invention, various operations of an injection molding machine can be performed in a favorable manner, by arranging the ejector rod at an appropriate position.

Embodiments of the present disclosure will be described below with reference to the drawings. In each drawing, the same elements may be denoted by the same reference numerals and duplicate descriptions may be omitted.

Injection Molding Machine

Figure 2:
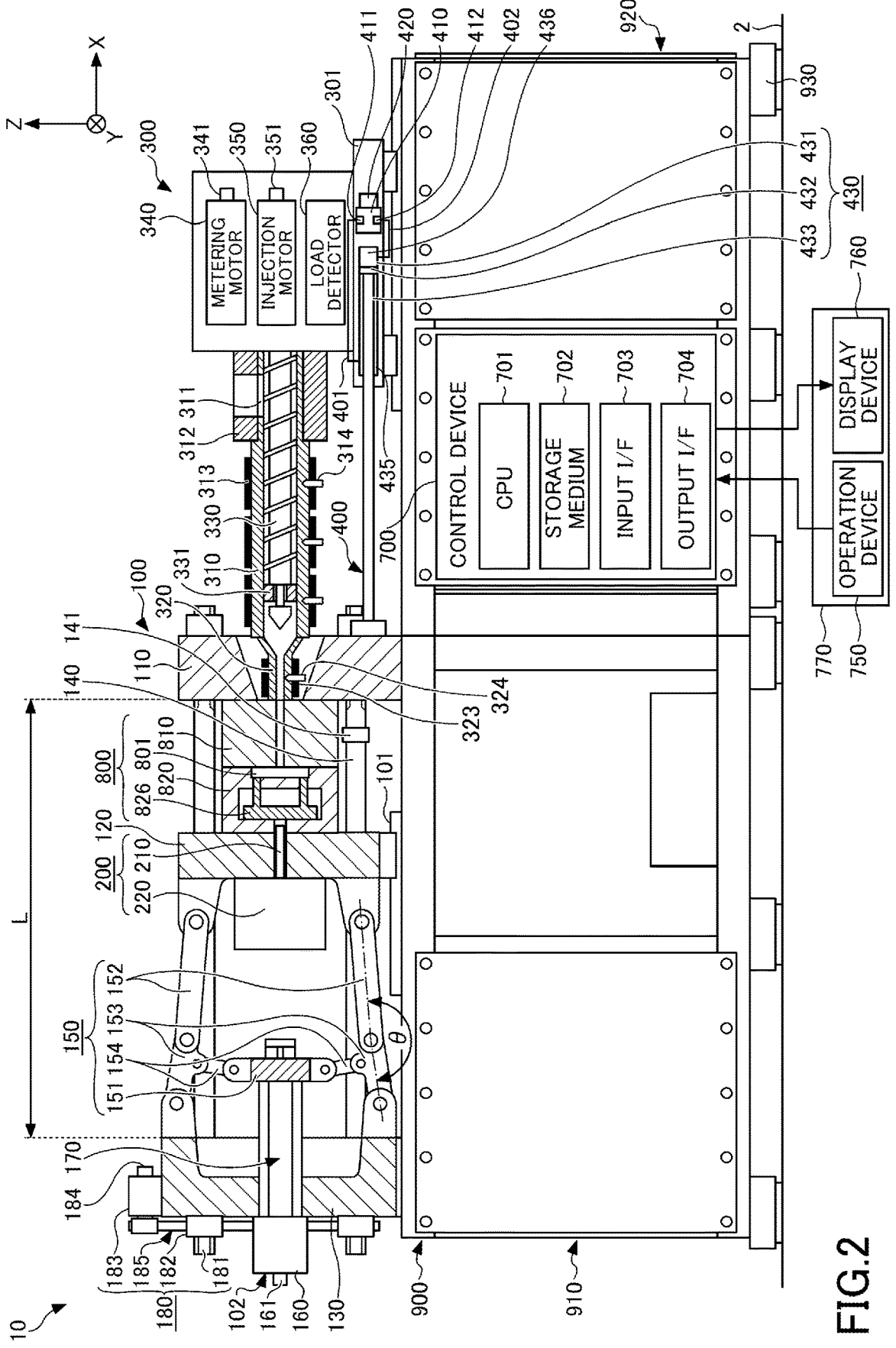
FIG. 2 is a diagram illustrating a state of an injection molding machine according to an embodiment at the time of mold clamping.

FIG. 1 illustrates the state of the injection molding machine according to an embodiment at the time of mold opening completion. FIG. 2 is a diagram illustrating the state of the injection molding machine according to the embodiment at the time of mold clamping. In the present specification, the X-axis, Y-axis and Z-axis directions are perpendicular to each other. The X-axis direction and the Y-axis direction represent the horizontal direction, and the Z-axis direction represents the vertical direction. When a mold clamping unit 100 is horizontal, the X-axis direction is the mold opening and closing direction and the Y-axis direction is the width direction of an injection molding machine 10. The negative side in the Y-axis direction is referred to as "the operation side", and the positive side in the Y-axis direction is referred to as "the non-operation side".

As illustrated in FIGS. 1 and 2, the injection molding machine 10 includes the mold clamping unit 100 that opens and closes a mold unit 800, an ejector unit 200 that ejects the molding product formed by the mold unit 800, an injection unit 300 that injects the molding material into the mold unit

800, a moving unit 400 that moves the injection unit 300 forward and backward with respect to the mold unit 800, a control device 700 that controls each element of the injection molding machine 10, and a frame 900 that supports each element of the injection molding machine 10. The frame 900 includes a mold clamping unit frame 910 supporting the mold clamping unit 100 and an injection unit frame 920 supporting the injection unit 300. The mold clamping unit frame 910 and the injection unit frame 920 are respectively installed on a floor 2 via a leveling adjuster 930. The control device 700 is arranged in the internal space of the injection unit frame 920. Each element of the injection molding machine 10 is described below.

Mold Clamping Unit

In the explanation of the mold clamping unit 100, the moving direction of a movable platen 120 when the mold is closed (for example, the positive X-axis direction) is described as forward, and the moving direction of the movable platen 120 when the mold is opened (for example, the negative X-axis direction) is described as backward.

The mold clamping unit 100 closes, pressurizes (boosts the pressure), clamps, depressurizes, and opens the mold unit 800. The mold unit 800 includes a stationary mold 810 and a movable mold 820.

The mold clamping unit 100 is a horizontal type, for example, and the mold opening and closing direction is the horizontal direction. The mold clamping unit 100 has a stationary platen 110 to which the stationary mold 810 is attached, the movable platen 120 to which the movable mold 820 is attached, and a moving mechanism 102 for moving the movable platen 120 in the mold opening and closing direction with respect to the stationary platen 110.

The stationary platen 110 is fixed to the mold clamping unit frame 910. The stationary mold 810 is attached to the surface of the stationary platen 110 facing the movable platen 120.

The movable platen 120 is arranged so as to be movable in the mold opening and closing direction with respect to the mold clamping unit frame 910. On the mold clamping unit frame 910, a guide 101 is laid to guide the movable platen 120. The movable mold 820 is attached to the surface of the movable platen 120 facing the stationary platen 110.

The moving mechanism 102 moves the movable platen 120 forward and backward with respect to the stationary platen 110 to close, pressurize (boost the pressure), clamp, depressurize, and open the mold unit 800. The moving mechanism 102 includes a toggle support 130 spaced apart from the stationary platen 110, a tie bar 140 connecting the stationary platen 110 and the toggle support 130, a toggle mechanism 150 that moves the movable platen 120 in the mold opening and closing direction with respect to the toggle support 130, a mold clamping motor 160 that causes the toggle mechanism 150 to operate, a motion conversion mechanism 170 that converts the rotational motion of the mold clamping motor 160 into a linear motion, and a mold space adjustment mechanism 180 that adjusts the interval between the stationary platen 110 and the toggle support 130.

The toggle support 130 is spaced apart from the stationary platen 110 and is mounted on the mold clamping unit frame 910 so as to be movable in the mold opening and closing direction. Note that the toggle support 130 may be arranged so as to be movable along a guide laid on the mold clamping unit frame 910. The guide of the toggle support 130 may be the same as the guide 101 of the movable platen 120.

In the present embodiment, the stationary platen 110 is fixed to the mold clamping unit frame 910 and the toggle support 130 is arranged with respect to the mold clamping unit frame 910 so as to be movable in the mold opening and closing direction, but the toggle support 130 may be fixed to the mold clamping unit frame 910 and the stationary platen 110 may be arranged with respect to the mold clamping unit frame 910 so as to be movable in the mold opening and closing direction.

The tie bar 140 connects the stationary platen 110 and the toggle support 130 with an interval L in the mold opening and closing direction. Multiple tie bars 140 (e.g., 4) may be used. The multiple tie bars 140 are arranged parallel to the mold opening and closing direction and extend according to the mold clamping force. At least one tie bar 140 may be provided with a tie bar distortion detector 141 that detects the distortion of the tie bar 140. The tie bar distortion detector 141 sends a signal indicating the detection result thereof to the control device 700. The detection result of the tie bar distortion detector 141 is used for the detection of the mold clamping force, etc.

Although the tie bar distortion detector 141 is used as the mold clamping force detector for detecting the mold clamping force in the present embodiment, the present invention is not limited thereto. The mold clamping force detector is not limited to a distortion gauge type, but may be a piezoelectric type, a capacitive type, a hydraulic type, an electromagnetic type, etc., and the attachment position thereof is not limited to the tie bar 140.

The toggle mechanism 150 is arranged between the movable platen 120 and the toggle support 130 to move the movable platen 120 with respect to the toggle support 130 in the mold opening and closing direction. The toggle mechanism 150 includes a crosshead 151 that moves in the mold opening and closing direction and a pair of link groups that bend and stretch by the movement of the crosshead 151. The pair of link groups includes a first link 152 and a second link 153, which are flexibly connected by a pin or the like. The first link 152 is swingably attached to the movable platen 120 by a pin or the like. The second link 153 is swingably attached to the toggle support 130 by a pin or the like. The second link 153 is attached to the crosshead 151 via a third link 154. When the crosshead 151 is moved forward and backward with respect to the toggle support 130, the first link 152 and the second link 153 are extended and retracted, and the movable platen 120 moves forward and backward with respect to the toggle support 130.

The configuration of the toggle mechanism 150 is not limited to the configuration illustrated in FIGS. 1 and 2. For example, in FIGS. 1 and 2, the number of nodes in each link group is 5, but the number of nodes may be 4, and one end of the third link 154 may be connected to the node between the first link 152 and the second link 153.

The mold clamping motor 160 is attached to the toggle support 130 to cause the toggle mechanism 150 to operate. The mold clamping motor 160 extends and retracts the first link 152 and the second link 153 by moving the crosshead 151 forward and backward with respect to the toggle support 130, and moves the movable platen 120 forward and backward with respect to the toggle support 130. The mold clamping motor 160 is directly connected to the motion conversion mechanism 170, but may be connected to the motion conversion mechanism 170 via a belt, a pulley, etc.

The motion conversion mechanism 170 converts the rotational motion of the mold clamping motor 160 into a linear motion of the crosshead 151. The motion conversion mechanism 170 includes a screw shaft and a screw nut that screws into the screw shaft. A ball or a roller may be interposed between the screw shaft and the screw nut.

The mold clamping unit 100 performs a mold closing process, a pressure-boosting process, a mold clamping process, a pressure-releasing process, and a mold opening process under the control of the control device 700.

In the mold closing process, the mold clamping motor 160 is driven to advance the crosshead 151 to the mold closing completion position at a set moving speed, thereby advancing the movable platen 120 and causing the movable mold 820 to touch the stationary mold 810. The position and moving speed of the crosshead 151 are detected by using, for example, a mold clamping motor encoder 161. The mold clamping motor encoder 161 detects the rotation of the mold clamping motor 160 and sends a signal indicating the result of the detection to the control device 700.

The crosshead position detector for detecting the position of the crosshead 151 and the crosshead moving speed detector for detecting the moving speed of the crosshead 151 are not limited to the mold clamping motor encoder 161, but general detectors may be used. The movable platen position detector for detecting the position of the movable platen 120 and the movable platen moving speed detector for detecting the moving speed of the movable platen 120 are not limited to the mold clamping motor encoder 161, and general detectors may be used.

In the pressure-boosting process, the mold clamping force is generated by further driving the mold clamping motor 160 to further advance the crosshead 151 from the mold closing position to the mold clamping position.

In the mold clamping process, the mold clamping motor 160 is driven to maintain the position of the crosshead 151 at the mold clamping position. In the mold clamping process, the mold clamping force generated in the pressure-boosting process is maintained. In the mold clamping process, a cavity space 801 (see FIG. 2) is formed between the movable mold 820 and the stationary mold 810, and the injection unit 300 fills the cavity space 801 with a liquid molding material. The inserted molding material is solidified, resulting in a molding product.

The number of cavity spaces 801 may be one or more. In the latter case, several molding products are obtained simultaneously. An insert material may be placed in one part of the cavity space 801 and the other part of the cavity space 801 may be filled with a molding material. A molding product that integrates the insert material and the molding material may be obtained.

In the pressure-releasing process, the mold clamping motor 160 is driven to retract the crosshead 151 from the mold clamping position to the mold opening start position, thereby retracting the movable platen 120 and reducing the mold clamping force. The mold opening start position and the mold closing completion position may be the same position.

In the mold opening process, the mold clamping motor 160 is driven to retract the crosshead 151 from the mold opening start position to the mold opening completion position at a set moving speed, thus retracting the movable platen 120 and separating the movable mold 820 from the stationary mold 810. Subsequently, the ejector unit 200 ejects the molding product from the movable mold 820.

The setting conditions in the mold closing process, the pressure-boosting process, and the mold clamping process are collectively set as a series of setting conditions. For example, the moving speed and position (including the mold closing start position, the moving speed switching position, the mold closing completion position, and the mold clamping position) of the crosshead 151 and the mold clamping force in the mold closing process and the pressure-boosting process, are collectively set as a series of setting conditions. The mold closing start position, the moving speed switching position, the mold closing completion position, and the mold clamping position are arranged in the stated order from the back side toward the front side and represent the start point and the end point of the section where the moving speed is set. For each section, a moving speed is set. The moving speed switching position may be one or more. The moving speed switching position need not be set. Only one of either the mold clamping position or the mold clamping force may be set.

Setting conditions in the pressure-releasing process and the mold opening process are similarly set. For example, the moving speed and the position (the mold opening start position, the moving speed switching position, and the mold opening completion position) of the crosshead 151 in the pressure-releasing process and the mold opening process are collectively set as a series of setting conditions. The mold opening start position, the moving speed switching position, and the mold opening completion position are arranged in the stated order from the front side toward the back side and represent the start point and the end point of the section where the moving speed is set. For each section, a moving speed is set. The moving speed switching position may be one or more. The moving speed switching position need not be set. The mold opening start position and the mold closing completion position may be the same position. The mold opening completion position and the mold closing start position may be the same.

Instead of the moving speed and position of the crosshead 151, the moving speed and position of the movable platen 120 may be set. Instead of the position of the crosshead (e.g., mold clamping position) or the position of the movable platen, the mold clamping force may be set.

Incidentally, the toggle mechanism 150 amplifies the driving force of the mold clamping motor 160 and transmits the driving force to the movable platen 120. The amplification factor thereof is also referred to as "the toggle factor". The toggle factor varies according to the angle $\theta$ (hereinafter also referred to as a "link angle $\theta$") formed by the first link 152 and the second link 153. The link angle $\theta$ is obtained from the position of the crosshead 151. When the link angle $\theta$ is 180 degrees, the toggle factor is at the maximum.

When the thickness of the mold unit 800 changes due to the replacement of the mold unit 800 or a change in the temperature of the mold unit 800, the mold space is adjusted so that a predetermined mold clamping force is obtained at the time of mold clamping. In the mold space adjustment, the interval L between the stationary platen 110 and the toggle support 130 is adjusted so that the link angle $\theta$ of the toggle mechanism 150 becomes a predetermined angle, for example, at the time of mold touch when the movable mold 820 touches the stationary mold 810.

The mold clamping unit 100 includes a mold space adjustment mechanism 180. The mold space adjustment mechanism 180 adjusts the interval L between the stationary platen 110 and the toggle support 130 to adjust the mold space. The timing when the mold space adjustment is performed is, for example, between the end of a molding cycle and the start of the next molding cycle. The mold space adjustment mechanism 180 includes, for example, a screw shaft 181 formed at the rear end of the tie bar 140, a screw nut 182 held rotatably but not movable back and forth by the toggle support 130, and a mold space adjustment motor 183 for rotating the screw nut 182 screwed to the screw shaft 181.

The screw shaft 181 and the screw nut 182 are provided for each tie bar 140. The rotational driving force of the mold space adjustment motor 183 may be transmitted to multiple screw nuts 182 via a rotational driving force transmitting part 185. Multiple screw nuts 182 can be rotated synchronously. By changing the transmission path of the rotational driving force transmitting part 185, it is also possible to rotate each of the multiple screw nuts 182 individually.

The rotational driving force transmitting part 185 is configured by, for example, gears. In this case, a driven gear is formed on the outer circumference of each screw nut 182, a driving gear is attached to the output shaft of the mold space adjustment motor 183, and a plurality of driven gears and an intermediate gear meshing with a driving gear are held rotatably at the center of the toggle support 130. The rotational driving force transmitting part 185 may be configured by a belt, a pulley or the like instead of a gear.

The operation of the mold space adjustment mechanism 180 is controlled by the control device 700. The control device 700 drives the mold space adjustment motor 183 to rotate the screw nut 182. As a result, the position of the toggle support 130 with respect to the tie bar 140 is adjusted and the interval L between the stationary platen 110 and the toggle support 130 is adjusted. Multiple mold space adjustment mechanisms may be used in combination.

The interval L is detected by using a mold space adjustment motor encoder 184. The mold space adjustment motor encoder 184 detects the rotation amount and the rotation direction of the mold space adjustment motor 183 and sends a signal indicating the result of the detection to the control device 700. The detection result of the mold space adjustment motor encoder 184 is used to monitor and control the position and the interval L of the toggle support 130. Note that the toggle support position detector for detecting the position of the toggle support 130 and the interval detector for detecting the interval L are not limited to the mold space adjustment motor encoder 184 and general detectors can be used.

The mold clamping unit 100 may have a mold temperature controller to adjust the temperature of the mold unit 800. Inside the mold unit 800, there is a flow path for a temperature control medium. The mold temperature controller adjusts the temperature of the mold unit 800 by adjusting the temperature of a temperature control medium supplied to the flow path of the mold unit 800.

The mold clamping unit 100 of the present embodiment is a horizontal type with the mold opening and closing direction in the horizontal direction, but the mold clamping unit 100 may be a vertical type with the mold opening and closing direction in the vertical direction.

The mold clamping unit 100 of the present embodiment has the mold clamping motor 160 as a driving unit, but the mold clamping unit 100 may have a hydraulic cylinder instead of the mold clamping motor 160. The mold clamping unit 100 may include a linear motor for mold opening and closing and an electromagnet for mold clamping.

Ejector Unit

In the description of the ejector unit 200, as in the description of the mold clamping unit 100, the moving direction of the movable platen 120 when the mold is closed (for example, the positive X-axis direction) is described as forward, and the moving direction of the movable platen 120 when the mold is opened (for example, the negative X-axis direction) is described as backward.

The ejector unit 200 is attached to the movable platen 120 and moves back and forth together with the movable platen 120. The ejector unit 200 has an ejector rod 210 that ejects the molding product from the mold unit 800 and a driving mechanism 220 that moves the ejector rod 210 in the moving direction (X-axis direction) of the movable platen 120.

The ejector rod 210 is arranged so as to be relatively movable with the movable platen 120. The front end of the ejector rod 210 is in contact with an advancing/retracting structure part 825 of the movable mold 820.

The driving mechanism 220 includes, for example, an ejector motor and a motion conversion mechanism that converts the rotational motion of the ejector motor into the linear motion of the ejector rod 210. The motion conversion mechanism includes a screw shaft and a screw nut that screws into the screw shaft. A ball or roller may be interposed between the screw shaft and the screw nut.

The ejector unit 200 performs the ejection process under the control of the control device 700. In the ejection process, the ejector rod 210 is advanced from the retraction position to the ejection position at a set moving speed, to advance the ejector plate 826, and eject the molding product. Subsequently, the ejector motor is driven to retract the ejector rod 210 at a set moving speed and the ejector plate 826 is retracted to the original retraction position.

The position and the moving speed of the ejector rod 210 are detected by using, for example, an ejector motor encoder. The ejector motor encoder detects the rotation of the ejector motor and sends a signal indicating the result of the detection to the control device 700. The ejector rod position detector for detecting the position of the ejector rod 210 and the ejector rod moving speed detector for detecting the moving speed of the ejector rod 210 are not limited to an ejector motor encoder, but general detectors can be used.

Injection Unit

In the description of the injection unit 300, unlike the description of the mold clamping unit 100 and the description of the ejector unit 200, the moving direction of a screw 330 during filling (for example, the negative X-axis direction) is described as forward and the moving direction of the screw 330 during metering (for example, the positive X-axis direction) is described as backward.

The injection unit 300 is installed on a slide base 301, and the slide base 301 is arranged so as to be movable back and forth with respect to the injection unit frame 920. The injection unit 300 is arranged so as to be movable back and forth with respect to the mold unit 800. The injection unit 300 touches the mold unit 800 and fills the cavity space 801 in the mold unit 800 with the molding material. The injection unit 300 includes, for example, the cylinder 310 that heats the molding material, a nozzle 320 provided at the front end of the cylinder 310, the screw 330 that is arranged in the cylinder 310 so as to be movable back and forth and rotatable, a metering motor 340 that rotates the screw 330, an injection motor 350 that moves the screw 330 forward and backward, and a load detector 360 that detects the load transmitted between the injection motor 350 and the screw 330.

The cylinder 310 heats the molding material supplied inside from a feed port 311. The molding material includes, for example, resin. The molding material is formed, for example, in the form of a pellet and is supplied to the feed port 311 in a solid state. The feed port 311 is formed at the rear of the cylinder 310. A cooler 312, such as a water-cooling cylinder, is provided on the outer periphery at the rear of the cylinder 310. In front of the cooler 312, the outer circumference of the cylinder 310 is provided with a first heater 313 such as a band heater and a first temperature detector 314.

The cylinder 310 is divided into multiple zones in the axial direction (e.g., X-axis direction) of the cylinder 310. Each of the multiple zones is provided with the first heater 313 and the first temperature detector 314. A set temperature is set in each of the multiple zones, and the control device 700 controls the first heater 313 so that the temperature detected by the first temperature detector 314 becomes the set temperature.

The nozzle 320 is provided at the front end of the cylinder 310 and is pressed against the mold unit 800. A second heater 323 and a second temperature detector 324 are provided on the outer periphery of the nozzle 320. The control device 700 controls the second heater 323 so that the detected temperature of the nozzle 320 becomes the set temperature.

The screw 330 is arranged so as to be rotatable and movable back and forth in the cylinder 310. As the screw 330 is rotated, the molding material is sent forward along the spiral groove of the screw 330. The molding material is gradually melted by heat from the cylinder 310 while being sent forward. As the liquid molding material is sent to the front of the screw 330 and accumulated at the front of the cylinder 310, the screw 330 is retracted. Subsequently, when the screw 330 is advanced, the liquid molding material accumulated in front of the screw 330 is injected from the nozzle 320 and is filled into the mold unit 800.

A backflow prevention ring 331 is attached to the front of the screw 330, so as to be movable back and forth, as a backflow prevention valve to prevent the backflow of the molding material from the front to the rear of the screw 330 when the screw 330 is pushed forward.

As the screw 330 is advanced, the backflow prevention ring 331 is pushed backward by the pressure of the molding material in front of the screw 330 and retreats relative to the screw 330 to a blocking position (see FIG. 2) that blocks the flow path of the molding material. This prevents the molding material accumulated in front of the screw 330 from flowing backward.

On the other hand, when the screw 330 is rotated, the backflow prevention ring 331 is pushed forward by the pressure of the molding material sent forward along the spiral groove of the screw 330 and is advanced relative to the screw 330 to an open position (see FIG. 1) that opens the flow path of the molding material. This sends the molding material to the front of the screw 330.

The backflow prevention ring 331 may be either a co-rotating type that rotates together with the screw 330 or a non-co-rotating type that does not rotate with the screw 330.

The injection unit 300 may include a driving source that moves the backflow prevention ring 331 back and forth with respect to the screw 330 between the open position and the closed position.

The metering motor 340 rotates the screw 330. The driving source for rotating the screw 330 is not limited to the metering motor 340, but may be, for example, a hydraulic pump.

An injection motor 350 moves the screw 330 back and forth. Between the injection motor 350 and the screw 330, a motion conversion mechanism or the like is provided to convert the rotational motion of the injection motor 350 into the linear motion of the screw 330. The motion conversion mechanism includes, for example, a screw shaft and a screw nut that screws into the screw shaft. A ball, roller or the like may be provided between the screw shaft and the screw nut. The driving source for moving the screw 330 forward and backward is not limited to the injection motor 350, but may be, for example, a hydraulic cylinder.

The load detector 360 detects the load transmitted between the injection motor 350 and the screw 330. The detected load is converted to pressure by the control device 700. The load detector 360 is provided in the transmission path of the load between the injection motor 350 and the screw 330 to detect the load acting on the load detector 360.

The load detector 360 sends a signal of the detected load to the control device 700. The load detected by the load detector 360 is converted into the pressure acting between the screw 330 and the molding material and is used to control and monitor the pressure that the screw 330 receives from the molding material, the back pressure against the screw 330, the pressure acting on the molding material from the screw 330, and the like.

The pressure detector for detecting the pressure of the molding material is not limited to the load detector 360, but a general pressure detector can be used. For example, a nozzle pressure sensor or a mold internal pressure sensor may be used. A nozzle pressure sensor will be installed in the nozzle 320. The mold internal pressure sensor will be installed inside the mold unit 800.

The injection unit 300 performs a metering process, a filling process, a hold pressure process, etc., under the control of the control device 700. The filling process and the hold pressure process may be collectively referred to as "the injection process".

In the metering process, the metering motor 340 is driven to rotate the screw 330 at a set rotational speed and feed the molding material forward along the spiral groove of the screw 330. Accordingly, the molding material is gradually melted. As the liquid molding material is sent in front of the screw 330 and accumulated at the front of the cylinder 310, the screw 330 is retracted. The rotational speed of the screw 330 is detected by using, for example, a metering motor encoder 341. The metering motor encoder 341 detects the rotation of the metering motor 340 and sends a signal indicating the detection result to the control device 700. The screw rotational speed detector for detecting the rotational speed of the screw 330 is not limited to the metering motor encoder 341, and general detectors can be used.

In the metering process, a set back pressure may be applied to the screw 330 by driving the injection motor 350 to limit the sudden retraction of the screw 330. The back pressure against the screw 330 is detected by using, for example, the load detector 360. When the screw 330 is retracted to the metering completion position and a predetermined amount of molding material accumulates in front of the screw 330, the metering process is completed.

The position and rotational speed of the screw 330 in the metering process are set together as a series of setting conditions. For example, a metering start position, a rotational speed switching position, and a metering completion position are set. These positions are arranged in the stated order from the front to the back and represent the start point and an end point of a section for which the rotational speed is set. For each section, a rotational speed is set. One or more rotational speed switching positions may be provided. The rotational speed switching position need not be set. Also, back pressure is set for each section.

In the filling process, the injection motor 350 is driven to advance the screw 330 at a set moving speed, and the liquid molding material accumulated in front of the screw 330 is filled into the cavity space 801 in the mold unit 800. The position and moving speed of the screw 330 are detected by using, for example, an injection motor encoder 351. The injection motor encoder 351 detects the rotation of the injection motor 350 and sends a signal indicating the result of the detection to the control device 700. When the position of the screw 330 reaches the set position, switching (what is termed as V/P switching) from the filling process to the hold pressure process is performed. The position where the V/P switching is performed is referred to as "the V/P switching position". The set moving speed of the screw 330 may be changed according to the position of the screw 330, time, etc.

The position and moving speed of the screw 330 in the filling process are set together as a series of setting conditions. For example, a filling start position (also referred to as "the injection start position"), a moving speed switching position, and a V/P switching position are set. These positions are arranged in the stated order from the back to the front and represent the start point and the end point of the section in which the moving speed is set. For each section, a moving speed is set. The moving speed switching position may be one or more. The moving speed switching position need not be set.

For each section where the moving speed of the screw 330 is set, an upper limit of the pressure of the screw 330 is set. The pressure of the screw 330 is detected by the load detector 360. If the pressure of the screw 330 is less than or equal to the set pressure, the screw 330 is advanced at the set moving speed. On the other hand, if the pressure of the screw 330 exceeds the set pressure, the screw 330 is advanced at a slower moving speed than the set moving speed so that the pressure of the screw 330 is less than or equal to the set pressure, for the purpose of mold protection.

After the position of the screw 330 reaches the V/P switching position in the filling process, the screw 330 may be temporarily stopped at the V/P switching position, and then the V/P switching may be performed. Immediately before the V/P switching, a slow forward or slow backward movement of the screw 330 may be performed instead of stopping the screw 330. Moreover, the screw position detector for detecting the position of the screw 330 and the screw moving speed detector for detecting the moving speed of the screw 330 are not limited to the injection motor encoder 351, and general detectors can be used.

During the hold pressure process, the injection motor 350 is driven to push the screw 330 forward, keeping the pressure of the molding material at the front end of the screw 330 (hereafter, also referred to as "holding pressure") at a set pressure, and pushing the remaining molding material in the cylinder 310 toward the mold unit 800. The amount of molding material that is deficient due to cooling and contracting in the mold unit 800 can be replenished. The holding pressure is detected by using, for example, the load detector 360. The set value of the holding pressure may be changed according to the elapsed time from the start of the hold pressure process, etc. The holding pressure in the hold pressure process and the time for holding the holding pressure may be set multiple times, respectively, and may be set together as a series of setting conditions.

During the hold pressure process, the molding material in the cavity space 801 in the mold unit 800 is gradually cooled, and upon completion of the hold pressure process, the inlet of the cavity space 801 is blocked by the solidified molding material. This state is referred to as "a gate seal" and prevents backflow of the molding material from the cavity space 801. After the hold pressure process, a cooling process is initiated. The cooling process involves solidifying the molding material in the cavity space 801. The metering process may be performed during the cooling process for the purpose of shortening the molding cycle time.

The injection unit 300 of the present embodiment is an in-line screw system, but a preplasticizing system or the like may be used. The injection unit of the preplasticizing system supplies an injection cylinder with the molding material melted in the plasticizing cylinder, and the injection cylinder injects the molding material into a mold unit. Within the plasticizing cylinder, a screw is arranged so as to be rotatable and not movable back and forth, or the screw is arranged so as to be rotatable and movable back and forth. On the other hand, in the injection cylinder, a plunger is arranged so as to be movable back and forth.

Further, the injection unit 300 of the present embodiment is a horizontal type in which the axial direction of the cylinder 310 is horizontal, but may be a vertical type in which the axial direction of the cylinder 310 is vertical. The mold clamping unit combined with the vertical injection unit 300 may be either vertical or horizontal. Similarly, the mold clamping unit combined with the horizontal injection unit 300 may be either horizontal or vertical.

Moving Unit

In the description of the moving unit 400, as in the description of the injection unit 300, the moving direction of the screw 330 during filling (for example, the negative X-axis direction) is referred to as "forward", and the moving direction of the screw 330 during metering (for example, the positive X-axis direction) is referred to as "backward".

The moving unit 400 moves the injection unit 300 forward and backward with respect to the mold unit 800. The moving unit 400 also presses the nozzle 320 against the mold unit 800 to produce nozzle touch pressure. The moving unit 400 includes a hydraulic pump 410, a motor 420 as a driving source, a hydraulic cylinder 430 as a hydraulic actuator, etc.

The hydraulic pump 410 has a first port 411 and a second port 412. The hydraulic pump 410 is a pump that can rotate in both directions, and by switching the rotation direction of the motor 420, hydraulic fluid (e.g., oil) is drawn from either one of the first port 411 or the second port 412 and discharged from the other port to generate hydraulic pressure. The hydraulic pump 410 can also suction the hydraulic fluid from a tank and discharge the hydraulic fluid from either the first port 411 or the second port 412.

The motor 420 operates the hydraulic pump 410. The motor 420 drives the hydraulic pump 410 in a rotational direction and by a rotational torque according to a control signal from the control device 700. The motor 420 may be an electric motor or an electric servomotor.

The hydraulic cylinder 430 has a cylinder body 431, a piston 432, and a piston rod 433. The cylinder body 431 is fixed to the injection unit 300. The piston 432 divides the inside of the cylinder body 431 into a front chamber 435 as a first chamber and a rear chamber 436 as a second chamber. The piston rod 433 is fixed to the stationary platen 110.

The front chamber 435 of the hydraulic cylinder 430 is connected to the first port 411 of the hydraulic pump 410 through a first flow path 401. The hydraulic fluid discharged from the first port 411 is supplied to the front chamber 435 through the first flow path 401, and the injection unit 300 is pushed forward. The injection unit 300 is advanced and the nozzle 320 is pressed against the stationary mold 810. The front chamber 435 functions as a pressure chamber that generates the nozzle touch pressure of the nozzle 320 by the pressure of the hydraulic fluid supplied from the hydraulic pump 410.

On the other hand, the rear chamber 436 of the hydraulic cylinder 430 is connected to the second port 412 of the hydraulic pump 410 through a second flow path 402. When the hydraulic fluid discharged from the second port 412 is supplied to the rear chamber 436 of the hydraulic cylinder 430 through the second flow path 402, the injection unit 300 is pushed backward. The injection unit 300 is retracted and the nozzle 320 is separated from the stationary mold 810.

Note that in the present embodiment, the moving unit 400 includes the hydraulic cylinder 430, but the present invention is not limited thereto. For example, instead of the hydraulic cylinder 430, an electric motor and a motion conversion mechanism that converts the rotational motion of the electric motor into the linear motion of the injection unit 300 may be used.

Control Device

The control device 700 is configured by, for example, a computer, and includes a CPU (Central Processing Unit) 701, a storage medium 702 such as a memory, an input interface (I/F) 703, and an output I/F 704 as illustrated in FIGS. 1 and 2. The control device 700 performs various control operations by having the CPU 701 execute a program stored in the storage medium 702. Further, the control device 700 receives a signal from the outside by the input I/F 703 and transmits a signal to the outside by the output I/F 704.

Figure 4:
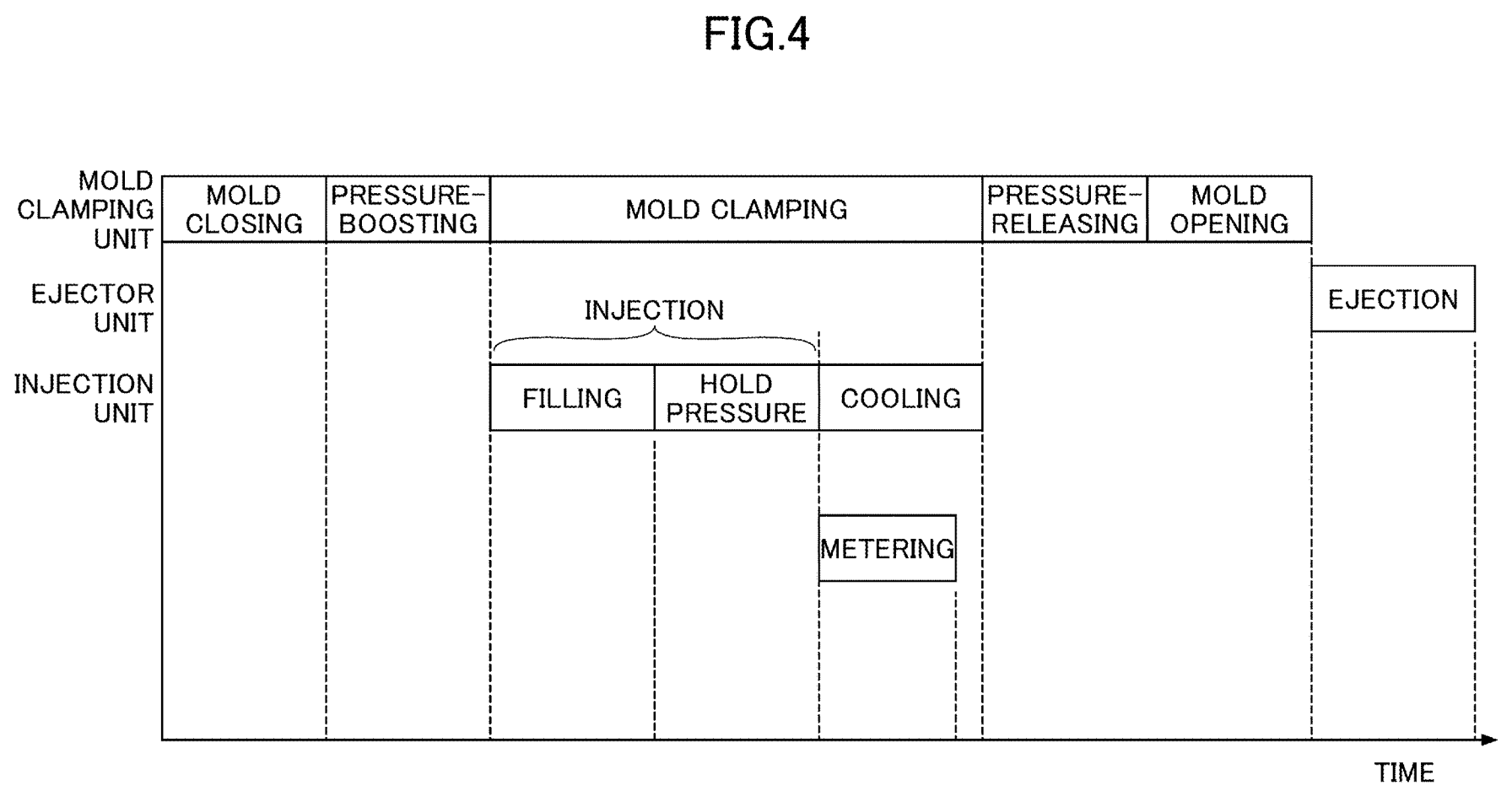

The control device 700 repeatedly manufactures a molding product by repeating the metering process, the mold closing process, the pressure-boosting process, the mold clamping process, the filling process, the hold pressure process, the cooling process, the pressure-releasing process, the mold opening process, and the ejection process (see also FIG. 4). The sequence of operations to produce a molding product, for example, from the beginning of the metering process to the beginning of the next metering process, is referred to as a "shot" or a "molding cycle". The time required for one shot is also referred to as the "molding cycle time" or the "cycle time".

One molding cycle includes, for example, a metering process, a mold closing process, a pressure-boosting process, a mold clamping process, a filling process, a hold pressure process, a cooling process, a pressure-releasing process, a mold opening process, and an ejection process, in the stated order. This order is the order of the start of each process. The filling process, the hold pressure process, and the cooling process are performed during the mold clamping process. The start of the mold clamping process may coincide with the start of the filling process. The completion of the pressure-releasing process coincides with the start of the mold opening process.

Multiple processes may be performed simultaneously for the purpose of shortening the molding cycle time. For example, the metering process may be performed during the cooling process of the previous molding cycle or during the mold clamping process. In this case, the mold closing process may be performed at the beginning of the molding cycle. The filling process may also be started during the mold closing process. The ejection process may also be started during the mold opening process. If an opening/closing valve is provided to open and close the flow path of the nozzle 320, the mold opening process may be started during the metering process. This is because even if the mold opening process is started during the metering process, the molding material does not leak from the nozzle 320 if the opening/closing valve closes the flow path of the nozzle 320.

Note that a single molding cycle may include processes other than the metering process, the mold closing process, the pressure-boosting process, the mold clamping process, the filling process, the hold pressure process, the cooling process, the pressure-releasing process, the mold opening process, and the ejection process.

For example, after the completion of the hold pressure process and before the start of the metering process, a pre-metering suck back process may be performed in which the screw 330 is retracted to a preset metering start position. The pressure of the molding material accumulated in front of the screw 330 before the start of the metering process can be reduced and the sudden retreat of the screw 330 at the start of the metering process can be prevented.

After the completion of the metering process and before the start of the filling process, a post-metering suck back process may be performed in which the screw 330 is retracted to a preset filling start position (also referred to as "the injection start position"). The pressure of the molding material accumulated in front of the screw 330 before the start of the filling process can be reduced and the leakage of the molding material from the nozzle 320 before the start of the filling process can be prevented.

The control device 700 is connected to an operation device 750 that receives input operations by the user and a display device 760 that displays a screen. The operation device 750 and the display device 760 are configured by, for example, a touch panel 770 and may be integrated. The touch panel 770, as the display device 760, displays a screen under control by the control device 700. Information such as the settings of the injection molding machine 10 and the current status of the injection molding machine 10 may be displayed on the screen of the touch panel 770. Moreover, in the screen of the touch panel 770, for example, an operation part such as a button or an input field for receiving an input operation by the user may be displayed. The touch panel 770, as the operation device 750, detects an input operation on the screen by the user and outputs a signal corresponding to the input operation to the control device 700. Thus, for example, while confirming the information displayed on the screen, the user can operate the operation part provided on the screen to make settings of the injection molding machine 10 (including input of setting values), etc. When the user operates the operation part provided on the screen, the operation of the injection molding machine 10 corresponding to the operation part can be performed. The operation of the injection molding machine 10 may be, for example, the operation (including stopping) of the mold clamping unit 100, the ejector unit 200, the injection unit 300, the moving unit 400, etc. Further, the operation of the injection molding machine 10 may be, for example, switching the screen displayed on the touch panel 770 as the display device 760.

The operation device 750 and the display device 760 of the present embodiment are described as being integrated as the touch panel 770, but these devices may be provided independently. Further, a plurality of operation devices 750 may be provided. The operation device 750 and the display device 760 are arranged on the operation side (negative Y-axis direction) of the mold clamping unit 100 (more specifically, the stationary platen 110).

Details of Control Device

Figure 3:
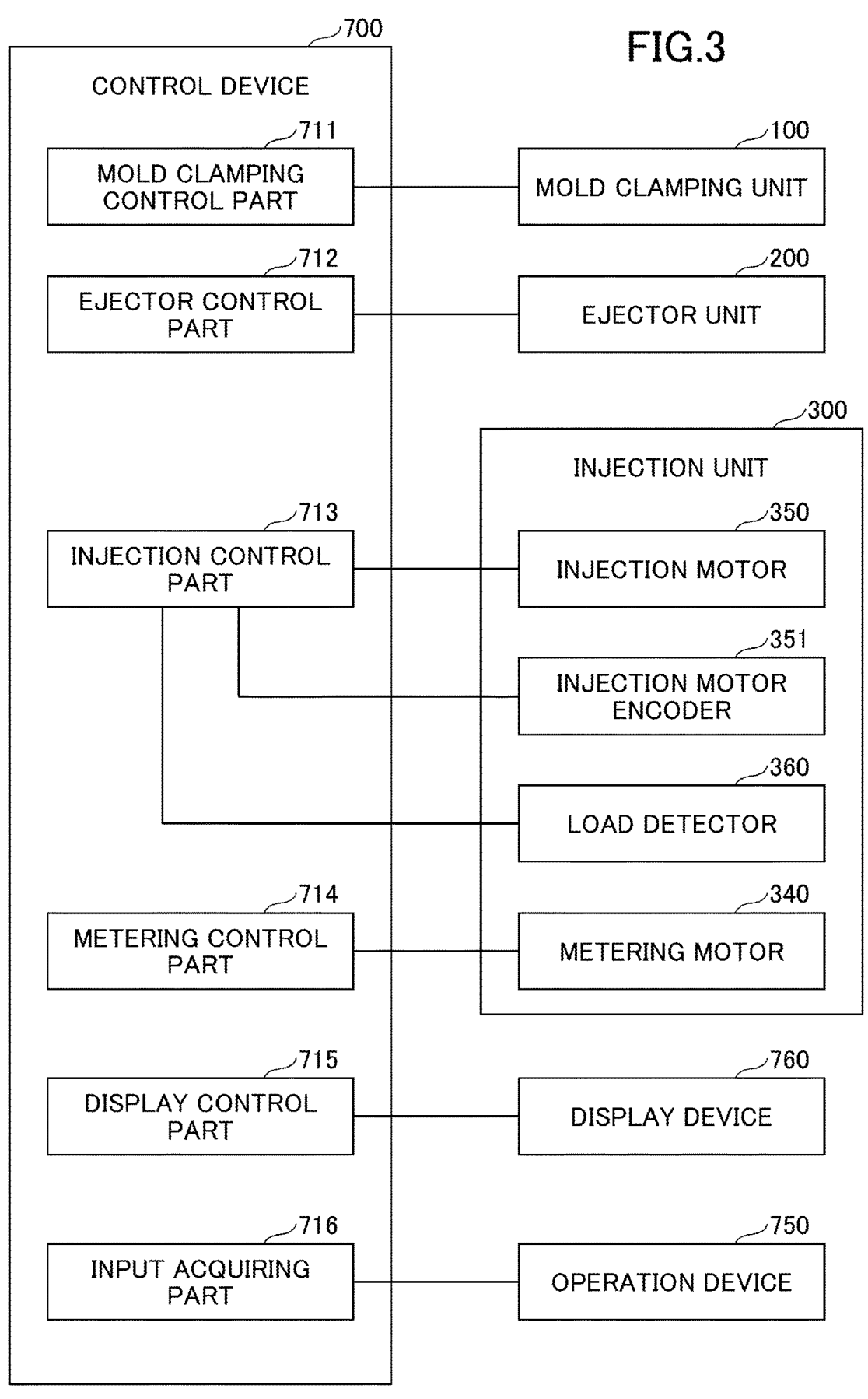
FIG. 3 is a diagram illustrating an example of elements of a control device as functional blocks.

Next, an example of elements of the control device 700 will be described with reference to FIG. 3. Note that the functional blocks illustrated in FIG. 3 are conceptual and do not necessarily need to be physically constructed as illustrated. All or some of the functional blocks can be functionally or physically distributed and integrated in arbitrary units. All or any part of the processing functions performed by the functional blocks can be implemented by a program executed by a CPU or by hardware according to wired logic.

As illustrated in FIG. 3, the control device 700 includes, for example, a mold clamping control part 711, an ejector control part 712, an injection control part 713, a metering control part 714, a display control part 715, and an input acquiring part 716. The mold clamping control part 711 controls the mold clamping unit 100 and performs the mold closing process, the pressure-boosting process, the mold clamping process, the pressure-releasing process, and the mold opening process illustrated in FIG. 4. The injection control part 713 controls the injection drive source of the injection unit 300 and performs an injection process. The injection drive source is, for example, the injection motor 350, but the injection drive source may be a hydraulic cylinder or the like. The injection process includes a filling process and a hold pressure process. The injection process occurs during the mold clamping process. The metering control part 714 controls the metering drive source of the injection unit 300 and executes a metering process. The metering drive source is, for example, the metering motor 340, but the metering drive source may be a hydraulic pump or the like. The metering process is performed during the cooling process.

The filling process is a process of controlling the injection drive source so that the actual value of the moving speed of the injection member provided inside the cylinder 310 becomes a set value. The filling process is a process of filling the mold unit 800 with liquid molding material (e.g., resin) accumulated in front of the injection member by moving the injection member forward. The injection member is, for example, the screw 330, but the injection member may be a plunger.

The movement speed of the injection member is detected by using a speed detector. The speed detector is, for example, an injection motor encoder 351. In the filling process, the pressure acting on the molding material from the injection member increases as the injection member advances. The filling process may include pausing the injection member or retracting the injection member immediately before the hold pressure process.

The hold pressure process is the process of controlling the injection drive source so that the actual value of the pressure applied from the injection member to the molding material becomes a set value. The hold pressure process is the process of replenishing the insufficient amount of molding material due to cooling shrinkage in the mold unit 800 by pushing the injection member forward. Pressure is detected by using a pressure detector such as the load detector 360. A nozzle pressure sensor or an in-mold pressure sensor may be used as the pressure detector.

The ejection process is a process of extracting the molded molding product 20 from the mold unit 800. When the ejector control part 712 recognizes the end of the mold opening process, the ejector control part 712 advances the ejector rod 210 to extrude the ejector plate 826. Thus, a plurality of ejector pins 827 fixed to the ejector plate 826 eject the molding product 20 from the movable mold 820.

Next, the configuration of the ejector unit 200 for performing this ejection process and nearby elements (the movable platen 120, the movable mold 820) will be described in more detail with reference to FIG. 5.

The ejector unit 200 is installed on the movable platen 120. The movable platen 120 includes, for example, a movable mold attachment part 510 to which the movable mold 820 is attached, and a first link attachment part 520 to which the first link 152 (see FIG. 1) of the toggle mechanism 150 is swingably attached. The movable platen 120 also includes a load transmitting part 530 to transmit a load (for example, a mold clamping force and a reaction force thereof) between the movable mold attachment part 510 and the first link attachment part 520.

The movable mold attachment part 510 has a square shape as viewed in the mold opening/closing direction, and a notch or a through hole for arranging the tie bar 140 is formed at the four corners thereof. An ejector rod space 512 for penetrating the movable mold attachment part 510 in the mold opening/closing direction is formed inside the movable mold attachment part 510. The ejector rod space 512 is located in the center of the movable mold attachment part 510 as viewed in the mold opening/closing direction view. The ejector rod space 512 is formed from a front end surface 511 of the movable mold attachment part 510 to the inner space of the load transmitting part 530.

The movable mold attachment part 510 is provided with a lock mechanism 540 for attaching the movable mold 820 to the movable platen 120. For example, the lock mechanism 540 may be configured by a plurality of structures protruding from the front end surface 511 of the movable mold attachment part 510 and connected to the side peripheral surface of the movable mold 820. Although not illustrated, the lock mechanism 540 is also provided on the stationary platen 110 for fixing the stationary mold 810.

The first link attachment part 520 is provided at four corners of the rear end surface of the load transmitting part 530. The first link attachment part 520 includes a plurality (four) of link attachment plates 521 arranged at intervals in the Z-axis direction and the Y-axis direction. A first link pin hole penetrating in the Y-axis direction is formed in the plurality of link attachment plates 521. Each first link 152 is swingably connected to each link attachment plate 521.

The load transmitting part 530 is formed in a rectangular frame shape as viewed in the mold opening/closing direction. The load transmitting part 530 firmly holds the ejector unit 200 at the interior and the rear end surface of the load transmitting part 530.

The movable mold 820 is attached to the movable platen 120 and advances and retracts together with the movable platen 120. The movable mold 820 is provided with a mold housing part 821 fixed to the movable platen 120 and an advancing/retracting structure part 825 arranged so as to advance and retract inside the mold housing part 821. The mold housing part 821 has a movable attachment plate 822 fixed to the movable platen 120, a spacer block 823 fixed to the movable attachment plate 822, and a movable plate 824 fixed to the spacer block 823.

An ejector rod hole 822a which penetrates the movable attachment plate 822 in the mold opening/closing direction is formed in the movable attachment plate 822. The inner diameter of the ejector rod hole 822a is larger than the outer diameter of the ejector rod 210. The movable mold 820 is installed on the movable platen 120 so that the ejector rod 210 can be moved without contact with the inner wall configuring the ejector rod hole 822a.

The spacer block 823 is formed in a rectangular frame shape as viewed in the mold opening/closing direction. The spacer block 823 forms a space 821s between the movable attachment plate 822 and the movable plate 824. In this space 821*s*, a part of the advancing/retracting structure part 825 (such as the ejector plate 826) is arranged so as to advance/retract.

The movable plate 824 forms the cavity space 801 in a mold clamping state with the stationary mold 810. The molding product 20 solidified after injection into the cavity space 801 retracts together with the movable plate 824 at the time of mold opening and is then ejected from the movable plate 824.

The mold housing part 821 has a plurality of guide pins 829 extending in the X-axis direction in the space 821*s* (between the movable attachment plate 822 and the movable plate 824). Each guide pin 829 guides the advancing/retracting of the advancing/retracting structure part 825.

The advancing/retracting structure part 825 includes, for example, a plate-like ejector plate 826 perpendicular to the mold opening/closing direction, and a plurality of ejector pins 827 protruding forward from the ejector plate 826.

The ejector plate 826 is arranged in the space 821*s* with each guide pin 829 inserted in the plate thickness direction. The ejector plate 826 is biased away from the movable plate 824 by a return spring 828 mounted on the outside of each guide pin 829.

The ejector pins 827 are respectively arranged in a plurality of pin holes penetrating the movable plate 824 in the mold opening/closing direction. Each ejector pin 827 advances and retracts integrally with the ejector plate 826. With the ejector plate 826 in contact with the movable attachment plate 822, the front end surface of each ejector pin 827 is flush with the front end surface of the movable plate 824. Each ejector pin 827 contacts the molding product 20 at the time of injection molding.

As described above, the ejector unit 200 has the ejector rod 210 and the driving mechanism 220 for moving the ejector rod 210. The ejector rod 210 advances and retracts in the mold opening/closing direction (X-axis direction) in the ejector rod space 512 of the movable mold attachment part 510, the ejector rod hole 822*a*, and the space 821*s* of the mold housing part 821. When advancing, the ejector rod 210 pushes forward the advancing/retracting structure part 825 relative to the mold housing part 821, thereby advancing the advancing/retracting structure part 825 and ejecting the molding product 20. When the ejector rod 210 retracts, the ejector plate 826 and each ejector pin 827 retracts integrally by the biasing of the return spring 828 of the advancing/retracting structure part 825.

The driving mechanism 220 of the ejector unit 200 is fixed to the load transmitting part 530 of the movable platen 120 via an attachment board (not illustrated). The driving mechanism 220 may have a configuration including an ejector motor and a motion conversion mechanism as described above, but is not limited thereto, and may also have a cylinder mechanism based on, for example, a pneumatic pressure or a hydraulic pressure. The ejector unit 200 may also include, between the ejector rod 210 and the driving mechanism 220, an ejector crosshead (not illustrated) or the like that guides the advancing and retracting movement of the ejector rod 210 in the X-axis direction.

Returning to FIG. 3, the display control part 715 of the control device 700 transmits information on a display screen related to injection molding before the start of injection molding, at each process during injection molding, after the end of injection molding, and the like, and causes the display device 760 to display the information. A plurality of display screens are prepared, and the display control part 715 enables switching the display of the screens and the overlapping display of the screens.

The input acquiring part 716 of the control device 700 acquires information on the operation contents of the operation device 750 operated by the user based on the display screen displayed on the display device 760. For example, when the setting contents of injection molding are changed by the user, the input acquiring part 716 stores the setting contents in the storage medium 702.

The control device 700 of the injection molding machine 10 according to the present embodiment has a plurality of operation modes for properly performing injection molding of the molding product 20, preparation for injection molding, and the like. When the control device 700 starts, the display control part 715 displays a display screen 761 (see FIG. 6A) on the display device 760 from which the user can select the plurality of operation modes. The user operates the operation device 750 based on the display screen 761 and selects an appropriate operation mode from the plurality of operation modes.

Figures 6A, 6B:
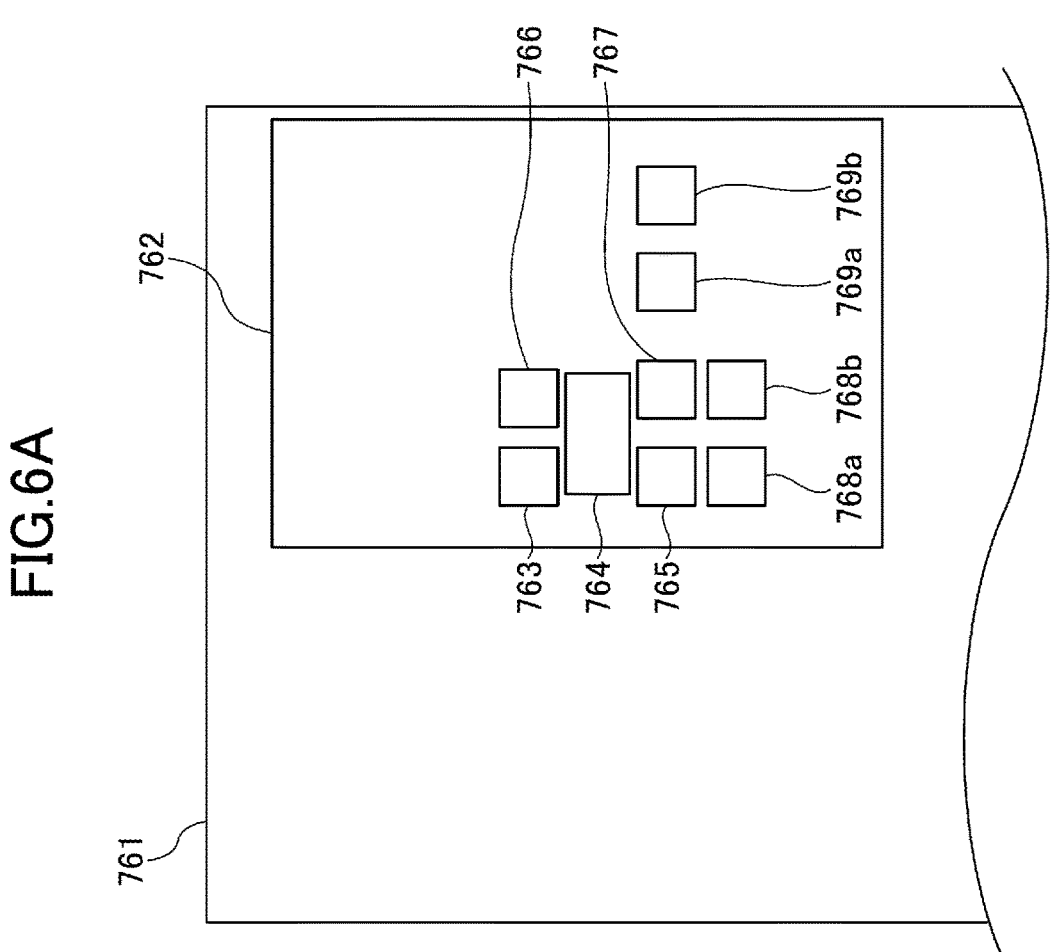
FIG. 6A is a diagram illustrating a display screen displayed on a display device.
FIG. 6B is a diagram illustrating an operation button for selecting a plurality of operation modes.

As illustrated in FIG. 6A, an operation panel image part 762 for displaying a plurality of operation buttons is displayed on the display screen 761 displayed on the display device 760. The control device 700 causes various operations in the injection molding machine 10 to be performed based on a touching operation by the user with respect to the operation buttons or a pressing operation of the pointer displayed on the display screen 761 (mouse clicking, etc.). The operation buttons are not limited to those displayed on the display screen 761, and may be physical buttons, etc.

The operation panel image part 762 includes a preparation mode button 763, an off button 764, a semi-automatic mode button 765, a manual mode button 766, and a fully automatic mode button 767 as operation buttons for setting a plurality of operation modes. In addition, the operation panel image part 762 includes a mold closing operation button 768*a* and a mold opening operation button 768*b* for operating the opening and closing of the mold clamping unit 100, and a retraction operation button 769*a* and an advancing operation button 769*b* for advancing and retracting the ejector rod 210.

As illustrated in FIG. 6B, the preparation mode button 763, the off button 764, the semi-automatic mode button 765, the manual mode button 766, and the fully automatic mode button 767 are arranged in an approximately X-shape centering around the off button 764. Each of the preparation mode button 763, the off button 764, the semi-automatic mode button 765, the manual mode button 766, and the fully automatic mode button 767 is displayed with marks, pictograms, letters, and the like indicating each operation mode for easy selection by the user.

The preparation mode button 763 causes the injection molding machine 10 to execute the preparation mode according to the user's operation. The preparation mode is a mode (an example of the first operation mode; hereinafter sometimes referred to as the preparation mode) used in the replacement work (removal work and attaching work) of the mold unit 800. In this preparation mode, the control device 700 limits the drive of the mold clamping motor 160 of the mold clamping unit 100. For example, the mold clamping control part 711 of the control device 700 limits the operation of the mold clamping motor 160 in the preparation mode to a lower speed and a lower torque than the operation of the mold clamping motor 160 in the injection molding mode (semi-automatic mode, fully automatic mode). In the preparation mode, the mold clamping control part 711 may set a limit value such as a speed limit, a torque limit, and an operation stroke limit for the mold clamping motor 160. As a matter of course, these limit values are set smaller than the limit values of the injection molding mode.

Further, in the preparation mode, the operations of only the mold clamping motor 160, the mold space adjustment motor 183, and the driving mechanism 220 (ejector motor) are basically permitted, and the operations of the metering motor 340, the injection motor 350, etc., are prohibited (interlocked). As a result, the injection molding machine 10 cannot operate the injection unit 300, and injection molding cannot be performed. In order to shorten the transition time from the preparation mode to the injection molding mode, the first heater 313 and the second heater 323 of the nozzle 320 may be operated even in the preparation mode.

Alternatively, the preparation mode may be used for purposes other than replacing the mold unit 800. For example, a scene in which the preparation mode is used other than replacing the mold unit 800 may include confirming the operation stroke of the ejector unit 200 in the installation state of the mold unit 800, confirming the operation stroke in the mold opening/closing direction (confirming the opening amount with a 3-plate mold, etc.), etc. In confirming the operation stroke of the ejector unit 200, the driving mechanism 220 may be operated at a lower speed than the injection molding mode to confirm the ejecting amount of the ejector unit 200, etc. Further, when a service person or the like confirms the operation after replacing the components, the injection molding machine 10 may be set to the preparation mode for trial operation. That is, there is a risk of breakage if the injection molding machine 10 is moved at a high speed in a state where the assembly of the components is bad, and, therefore, by first operating at a low speed in the preparation mode, the assembly of the components can be properly confirmed.

On the other hand, the off button 764 is a button pressed at the time of preparation for operation or at the end of operation in the injection molding machine 10. For example, when the off button 764 is pressed by the user, all operations of devices other than a predetermined device (for example, the first heater 313 and the second heater 323 of the nozzle 320) are prohibited (interlocked).

The injection molding machine 10 has an automatic mode that automatically performs the molding cycle (metering process, mold closing process, pressure-boosting process, mold clamping process, filling process, hold pressure process, cooling process, pressure-releasing process, mold opening process, and ejection process) based on the control by the control device 700. The automatic mode is an example of the second operation mode. The automatic mode according to the present embodiment includes a semi-automatic mode in which injection molding is performed automatically for only one cycle and a fully automatic mode in which injection molding is performed continuously according to a molding program. The injection molding machine 10 may have only one of the semi-automatic mode and the fully automatic mode as the automatic mode.

The semi-automatic mode button 765 is a button pressed when selecting the semi-automatic mode. The user uses the semi-automatic mode (as described above, an example of the second operation mode), for example, when confirming the molding program, when trial-molding the molding product 20, when stopping continuous operation, etc.

The manual mode button 766 is a button pressed when the user himself/herself operates each device of the injection molding machine 10. For example, the user operates each of the mold clamping motor 160, the metering motor 340, the injection motor 350, and the ejector unit 200 by operating each operation button of the operation panel image part 762, and confirms the operation of each device.

The fully automatic mode button 767 is a button pressed when the fully automatic mode is selected. That is, the user uses the fully automatic mode (as described above, an example of the second operation mode) when he/she repeats the work of manufacturing the molding product 20 by performing each process of the injection molding in turn.

The control device 700 (see FIG. 3) permits, prohibits, or limits the operation of each device according to the operation mode selected by the user among the plurality of operation modes. For example, when the preparation mode is set, the control device 700 prohibits the operation of the injection unit 300 by the injection control part 713 and the metering control part 714, and limits the operation of the mold clamping unit 100 by the mold clamping control part 711.

The work of replacing the mold unit 800 is carried out in the state that the preparation mode is set, that is, the operation of the mold clamping unit 100 is limited (the mold clamping motor 160 is reduced in speed and torque). Next, work of replacing (removal work) the mold unit 800 in the injection molding machine 10 will be described with reference to FIGS. 7A to 7D.

Figure 7A:
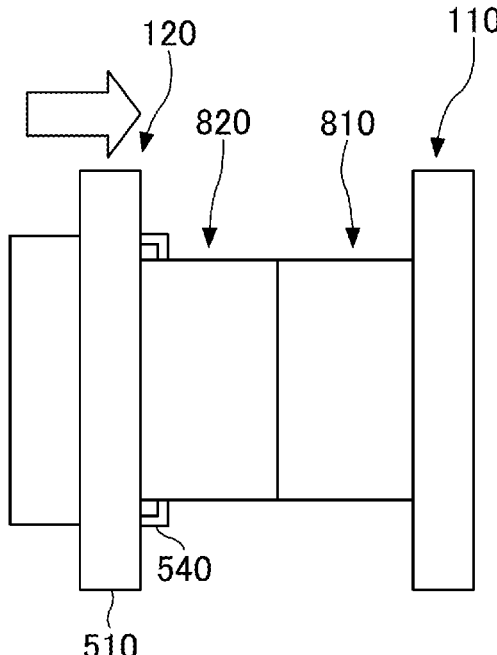
FIG. 7A is a diagram illustrating the operation of the removal work of removing the mold unit.

As illustrated in FIG. 7A, in the work of removing the mold unit 800, the user first closes the stationary mold 810 and the movable mold 820 of the mold unit 800 by pressing the mold closing operation button 768a of the operation panel image part 762. The mold clamping control part 711 advances the movable mold 820 at a low speed and a low torque to cause the movable mold 820 to contact the stationary mold 810, as the preparation mode has been set earlier. The movement of the movable mold 820 may drive the mold space adjustment motor 183 in addition to driving the mold clamping motor 160.

Then, the stationary mold 810 and the movable mold 820 are integrated by using a connecting unit (not illustrated) installed outside the stationary mold 810 and the movable mold 820 in a state of contact (mold closure) between the stationary mold 810 and the movable mold 820. A jig or the like for fixing the mold unit 800 may be applied as the connecting unit.

Figure 7B:
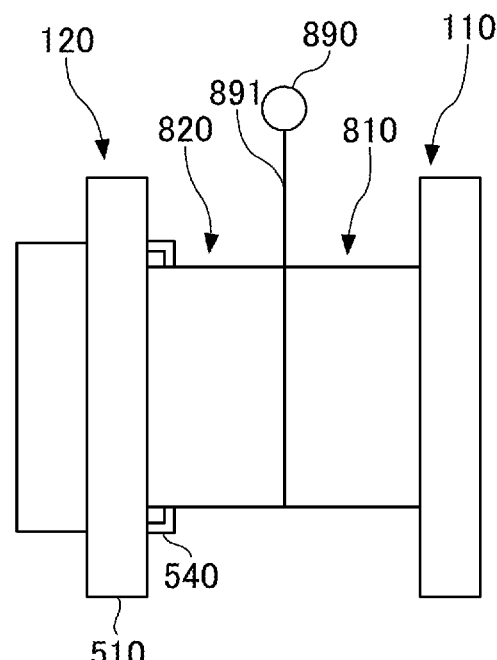
FIG. 7B is a diagram illustrating the operation following FIG. 7A.

Further, in the work of removing the mold unit 800, as illustrated in FIG. 7B, a crane 890 is used to support the mold unit 800 to be removed from the mold clamping unit 100. The crane 890 hangs a wire 891 for hanging the mold unit 800 from above. The user attaches the mold unit 800 in which the stationary mold 810 and the movable mold 820 are integrated by the connecting unit, to the wire 891 so that the mold unit 800 can be suspended and supported by the crane 890.

Figure 7C:
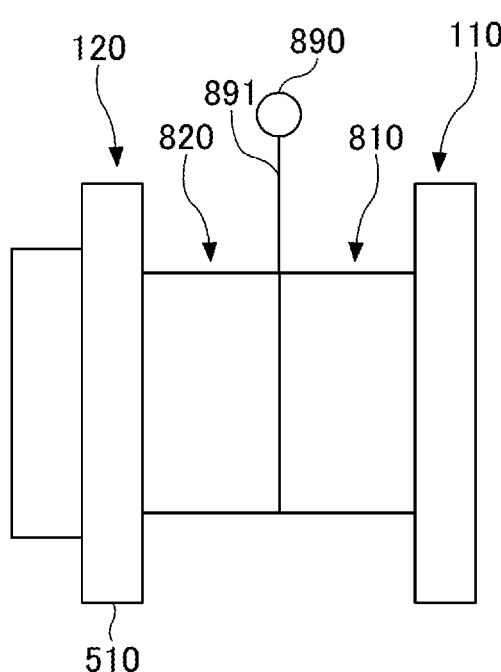
FIG. 7C is a diagram illustrating the operation following FIG. 7B.
Figure 7D:
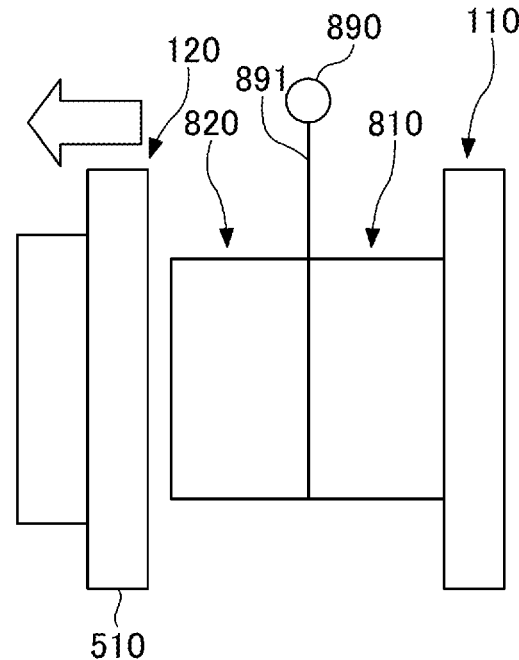
FIG. 7D is a diagram illustrating the operation following FIG. 7C.

In the state where the mold unit 800 is attached by the crane 890, as illustrated in FIG. 7C, the user releases the lock mechanism 540 which locks the mold unit 800 to the mold clamping unit 100. As a result, the mold unit 800 can be separated from the mold clamping unit 100.

Then, the user first presses the mold opening operation button 768b of the operation panel image part 762 to open (slightly open) the stationary mold 810 and the movable mold 820 of the mold unit 800. Thus, the movable mold 820 suspended on the crane 890 is separated from the movable platen 120. Thereafter, the user transfers the mold unit 800 to another location by moving the mold unit 800 by the crane 890 in a free state.

Further, in the work of attaching another mold unit 800 to the mold clamping unit 100, the procedure opposite to the removal work described above is performed (the description of the specific operation is omitted). Thus, the injection molding machine 10 can fix another movable mold 820 to the movable platen 120 while fixing another stationary mold 810 to the stationary platen 110.

Figure 5:
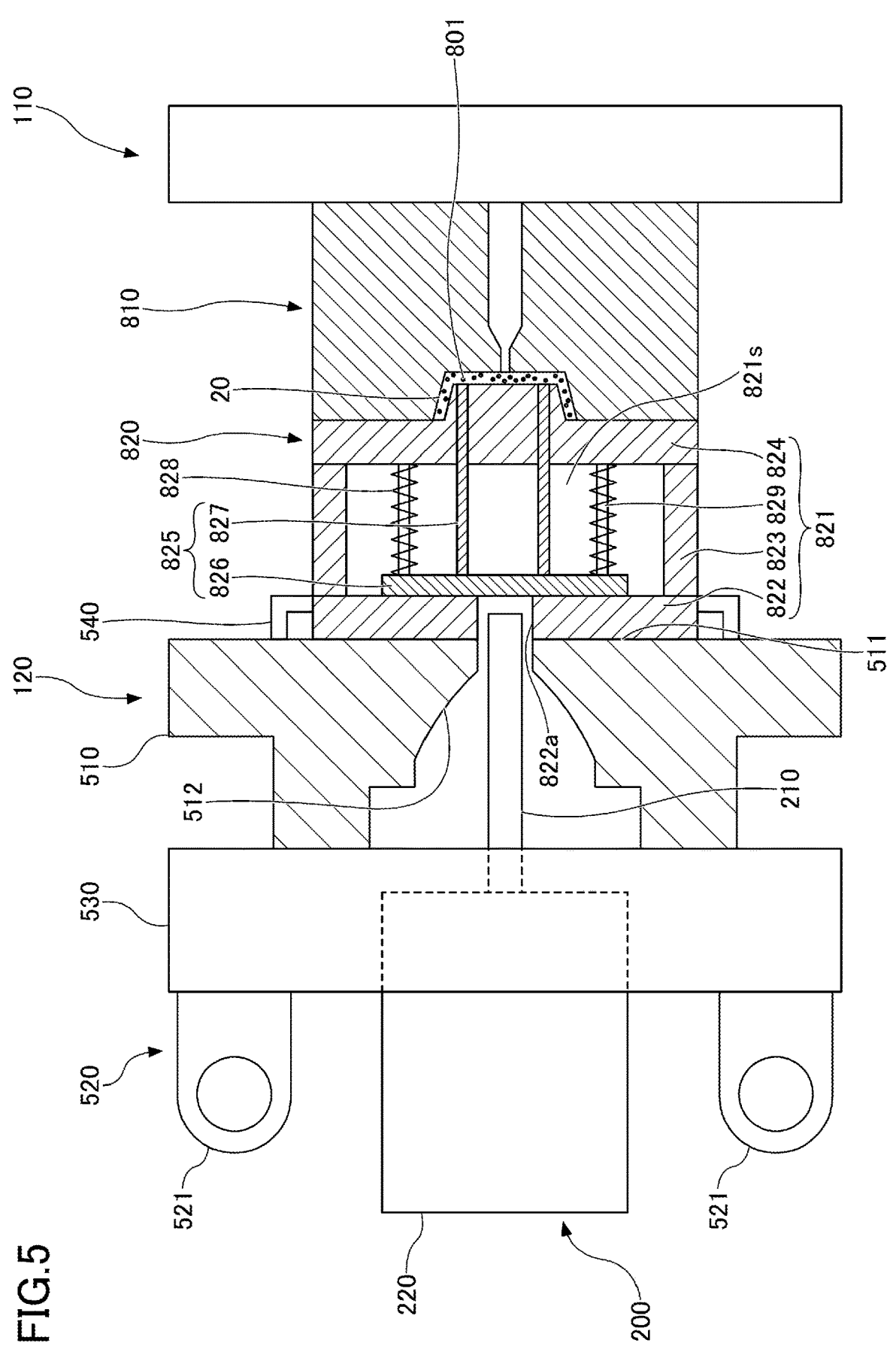
FIG. 5 is a side sectional view illustrating a mold clamping unit, an ejector unit, and a mold unit in an enlarged view.

As illustrated in FIG. 5, in the above work of replacing the mold unit 800, a state in which the tip of the ejector rod 210 of the ejector unit 200 protrudes from the front end surface 511 of the movable platen 120 (the movable mold attachment part 510) is considered. For example, when the mold unit 800 is removed from the movable platen 120 in a form in which the mold unit 800 is suspended by the crane 890, the mold unit 800 may move slightly up and down due to the extension of the wire 891 or the like. Due to such displacement of the mold unit 800, the mold unit 800 may collide (interfere) with the ejector rod 210 protruding from the front end surface 511, and the ejector unit 200 may be damaged.

Figures 8A, 8B:
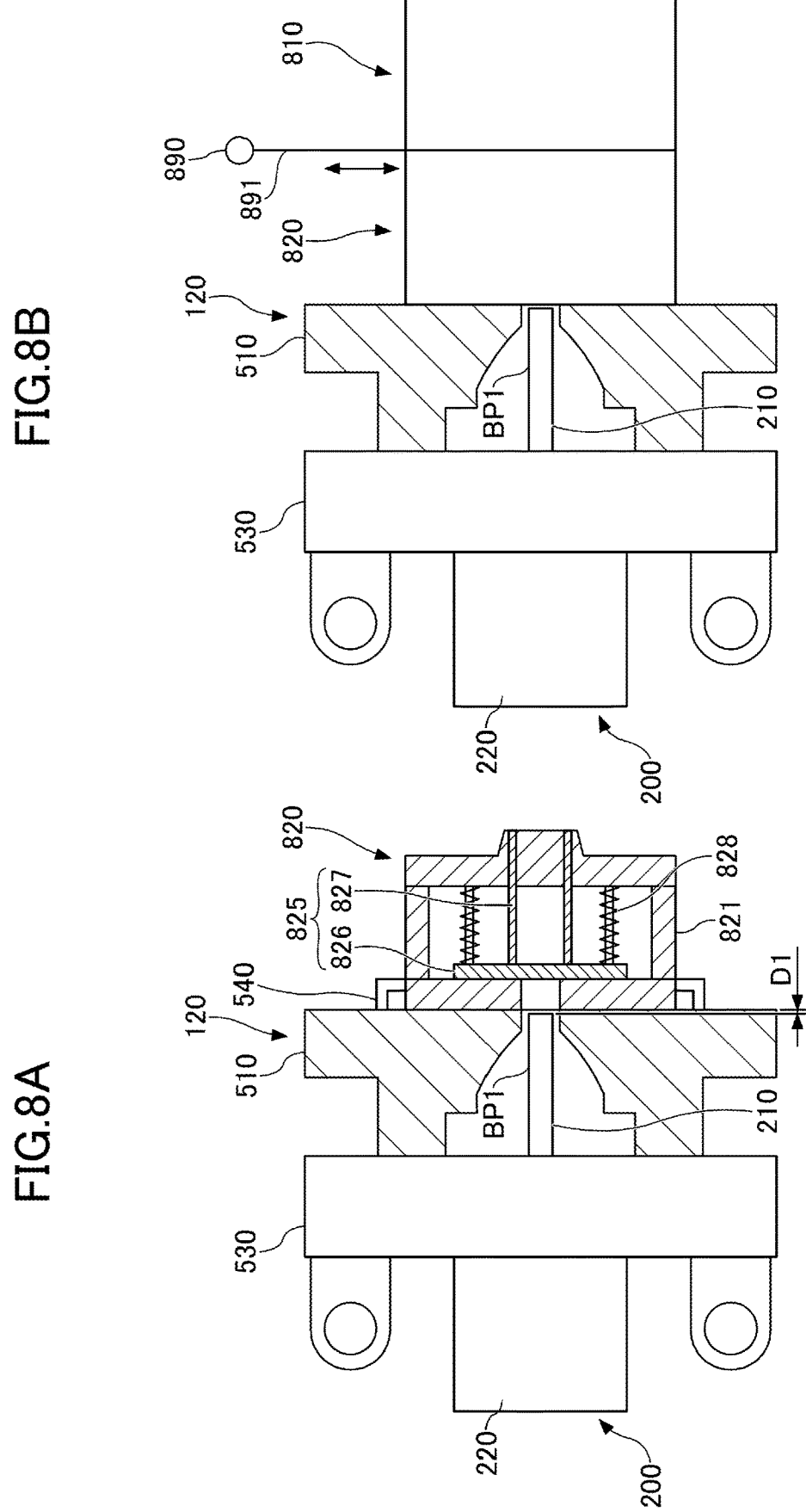
FIG. 8A is a diagram illustrating a state in which the ejector rod is arranged in the first retraction position in the preparation mode.
FIG. 8B is a diagram illustrating replacement work of replacing the mold unit in the preparation mode.
Figures 9A, 9B:
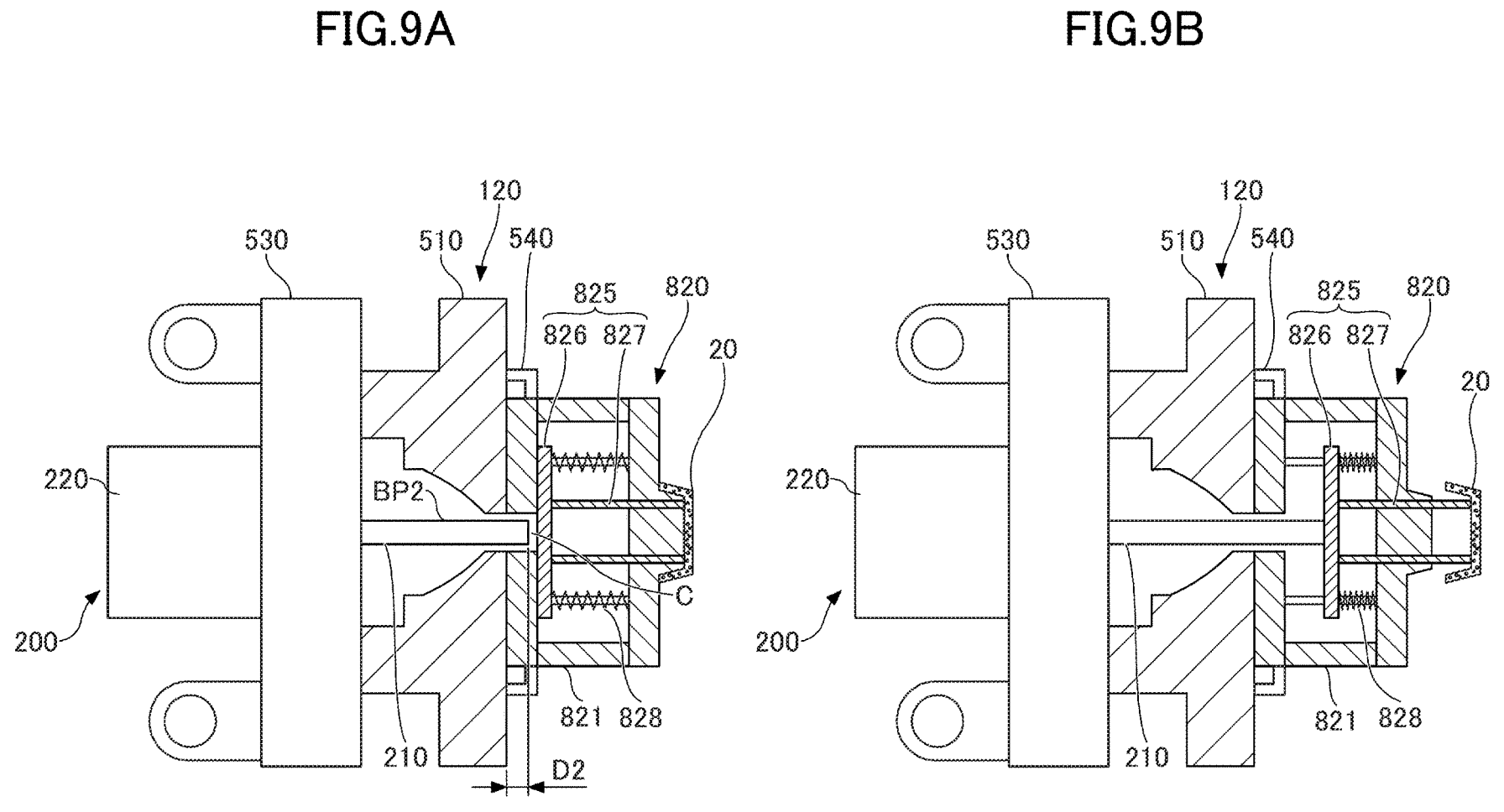

Therefore, as illustrated in FIGS. 8A and 9A, the injection molding machine 10 according to the present embodiment sets a retraction position where the ejector rod 210 retracts to and waits, at a plurality of mutually different (two) positions according to a plurality of operation modes. The first retraction position is a first retraction position BP1 at which the tip of the ejector rod 210 is separated further away from the stationary platen 110 side, relative to the tip of the ejector rod 210 arranged in the injection molding mode. In particular, at the first retraction position BP1 according to the present embodiment, the tip of the ejector rod 210 is set to the rear side (X-axis negative direction side) of the front end surface 511 of the movable platen 120. The second retraction position is the second retraction position BP2 at which the tip of the ejector rod 210 protrudes further towards the stationary platen 110 side, relative to the tip of the ejector rod 210 arranged at the first retraction position BP1. In particular, at the second retraction position BP2 according to the present embodiment, the tip of the ejector rod 210 is set further in a forward direction (X-axis positive direction side), relative to the front end surface 511 of the movable platen 120. Note that the first retraction position BP1 and the second retraction position BP2 are set further towards the X-axis positive direction side (the stationary platen 110 side), relative to the mechanical retraction limit position of the ejector rod 210, and the ejector unit 200 may have a separate retraction limit position of the ejector rod 210.

In the preparation mode, the ejector rod 210 is arranged at the first retraction position BP1. For example, when the X-axis negative direction is expressed as − and the X-axis positive direction is expressed as + with respect to the front end surface 511, the distance D1 from the front end surface 511 to the tip of the ejector rod 210 at the first retraction position BP1 may be set to a range of approximately 0 mm to −30 mm. Therefore, the first retraction position BP1 may be a position where the tip of the ejector rod 210 coincides with the front end surface 511. Thus, when the preparation mode is set for performing the work of replacing the mold unit 800, the tip of the ejector rod 210 does not protrude from the front end surface 511 of the movable platen 120. Even if the mold unit 800 moves vertically in the replacing work, contact with the ejector rod 210 can be avoided.

The control device 700 may control moving the ejector rod 210 to the first retraction position BP1 in accordance with the selection of the preparation mode by the user. However, the preparation mode is applied to other work other than the work of replacing the mold unit 800 as described above. Therefore, in the present embodiment, the ejector rod 210 located at the second retraction position BP2 is set to move to the first retraction position BP1 based on the operation of the retraction operation button 769a by the user in the preparation mode.

When the preparation mode is selected by the user, the control device 700 controls to guide the ejector rod 210 to the first retraction position BP1. For example, the control device 700 prohibits the opening/closing movement of the mold clamping unit 100 when the ejector rod 210 is at the second retraction position BP2 in the preparation mode. This prevents the work of replacing the mold unit 800, so that the user performs the operation of moving the ejector rod 210 to the first retraction position BP1 before the operation of closing the mold by the mold clamping unit 100.

When the control device 700 recognizes that the ejector rod 210 is located at the first retraction position BP1 based on the operation of the retraction operation button 769a by the user, the control device 700 permits the opening/closing movement of the mold clamping unit 100. As a result, the injection molding machine 10 can perform the work of replacing the mold unit 800 in a state where the tip of the ejector rod 210 surely does not protrude from the front end surface 511 of the movable platen 120.

On the other hand, in the automatic mode (semi-automatic mode, fully automatic mode) and the manual mode described above, as illustrated in FIG. 9A, the ejector rod 210 is arranged at the second retraction position BP2. The second retraction position BP2 (the distance D2 between the front end surface 511 of the movable platen 120 and the tip of the ejector rod 210) may be set at an appropriate position according to the thickness of the movable attachment plate 822, the idle traveling distance between the ejector rod 210 and the ejector plate 826, and the like.

Thus, when the injection molding mode is set for injection molding the molding product 20, the tip of the ejector rod 210 is positioned sufficiently close to the ejector plate 826. As illustrated in FIG. 9B, the operating distance of the ejector rod 210 during injection molding is reduced, and, therefore, the injection molding machine 10 can shorten the cycle of the entire injection molding including the ejection process. Further, it is possible to mitigate the impact when the ejector rod 210 contacts the ejector plate 826.

When the ejector rod is at the first retraction position BP1, the control device 700 may control to move the ejector rod 210 to the second retraction position BP2 in accordance with the user's selection of one of a semi-automatic mode, a fully automatic mode, or a manual mode. However, in the semi-automatic mode, the fully automatic mode, and the manual mode, there is another operation such as confirming the operation of the device. Therefore, in the present embodiment, the ejector rod 210 located at the first retraction position BP1 is set to be moved to the second retraction position BP2 based on the operation of the advancing operation button 769b by the user.

When the user selects one of the semi-automatic mode, the fully automatic mode, or the manual mode, the control device 700 may control the ejector rod 210 to be guided to the second retraction position BP2. For example, the control device 700 may prohibit the operation of injection molding when the ejector rod 210 is at the first retraction position BP1 in the semi-automatic mode, the fully automatic mode, the manual mode, or the like. Thus, the user may first perform an operation to move the ejector rod 210 to the second retraction position BP2.

When the control device 700 recognizes that the ejector rod 210 is located at the second retraction position BP2 based on the user's operation of the advancing operation button 769b, injection molding is permitted. As a result, injection molding can be stably performed in a state where the tip of the ejector rod 210 is close to the ejector plate 826. Note that the control device 700 may be configured to perform the semi-automatic mode, the fully automatic mode, and the manual mode by arranging the ejector rod 210 at the first retraction position BP1 when there is almost no idle traveling distance.

Figure 10:
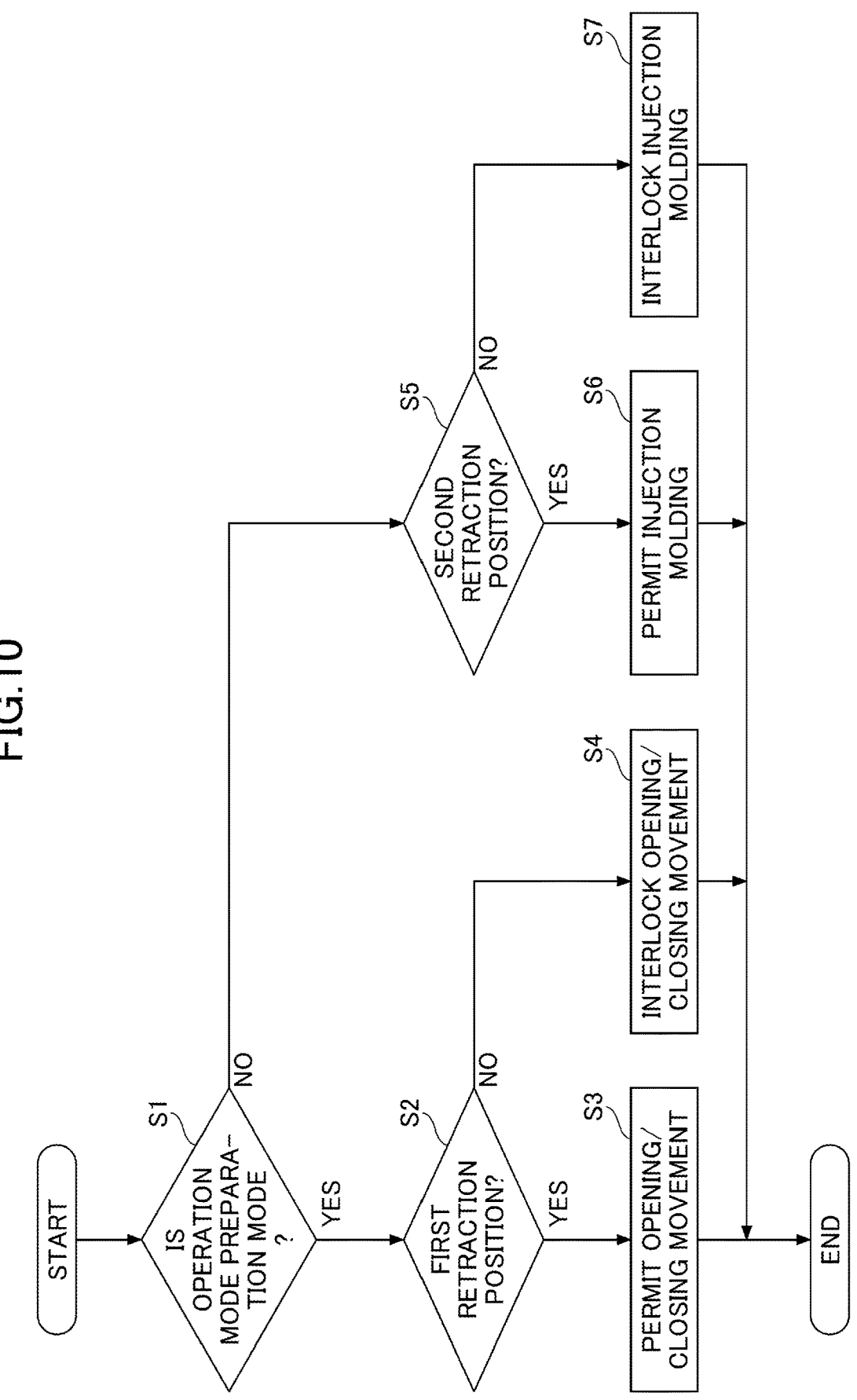
FIG. 10 is a flowchart illustrating an operation method for guiding the position of the ejector rod according to the operation mode.

The injection molding machine 10 according to the present embodiment is basically formed as described above, and a control method for changing the retraction position of the ejector rod 210 will be described below with reference to FIG. 10.

When the injection molding machine 10 is operated, the control device 700 recognizes an operation mode selected by the user among a plurality of preset operation modes (preparation mode, off mode, semi-automatic mode, manual mode, fully automatic mode). For example, the control device 700 determines whether the preparation mode is selected by the user (step S1). If the preparation mode is selected (step S1: YES), the process proceeds to step S2, and if the preparation mode is not selected (step S1: NO), the process proceeds to step S5.

In step S2, the control device 700 determines whether the current position of the ejector rod 210 is at the first retraction position BP1. If the ejector rod 210 is at the first retraction position BP1 (step S2: YES), the process proceeds to step S3, and if the ejector rod 210 is not at the first retraction position BP1 (step S2: NO), the process proceeds to step S4.

In step S3, the control device 700 permits opening and closing movement by the mold clamping unit 100 based on the ejector rod 210 being at the first retraction position BP1. Thus, the control device 700 operates the mold clamping unit 100 based on the operation of the mold closing operation button 768a by the user. As a result, the user can stably perform the work of replacing the mold unit 800 after the stationary mold 810 and the movable mold 820 are closed (see also FIGS. 7A to 7D).

On the other hand, in step S4, the control device 700 prohibits (interlocks) the opening/closing movement by the mold clamping unit 100 on the basis that the ejector rod 210 is located at the second retraction position BP2. As a result, even when the mold closing operation button 768a is operated, the user cannot perform the replacing work without closing the mold unit 800, so that the user can be guided to first perform the operation of moving the ejector rod 210 to the first retraction position BP1. At this time, the control device 700 may send a report to request the ejector rod 210 to be moved to the first retraction position BP1 through the display device 760, a speaker, or the like. If the same processing flow is performed while the ejector rod 210 is moved to the first retraction position BP1, the work of replacing the mold unit 800 can be successfully performed in step S3.

In a case other than the preparation mode in step S1 (step S1: NO), it is often more convenient for the ejector rod 210 to be at the second retraction position BP2. Therefore, in step S5, the control device 700 determines whether the position of the ejector rod 210 is at the second retraction position BP2. If the ejector rod 210 is at the second retraction position BP2 (step S5: YES), the process proceeds to step S6, and if the ejector rod 210 is not at the second retraction position BP2 (step S5: NO), the process proceeds to step S7.

In step S6, the control device 700 permits the operation of injection molding by the injection molding machine 10 on the basis that the ejector rod 210 is located at the second retraction position BP2. Therefore, the injection molding machine 10 can execute injection molding to produce a molding product.

On the other hand, in step S7, the control device 700 prohibits (interlocks) the operation of injection molding on the basis that the ejector rod 210 is located at the first retraction position BP1. As a result, the user moves the ejector rod 210 to the second retraction position BP2. If the same processing flow is performed while the ejector rod 210 is moved to the second retraction position BP2, injection molding can be successfully performed in step S6.

As described above, the injection molding machine 10 and the control device 700 according to the present embodiment can successfully perform various operations of the injection molding machine 10 by arranging the ejector rod 210 at an appropriate position in each of a plurality of operation modes. As a result, the injection molding machine 10 can achieve improvement of operation efficiency, avoidance of breakage of elements, etc. In particular, in the injection molding mode (second operation mode), the ejector rod 210 is arranged at the second retraction position BP2. As a result, the injection molding machine 10 can shorten the idle traveling distance of the ejector rod 210, improve the efficiency of the ejection process of the molding product 20, and mitigate the impact on the ejector plate 826 or the molding product 20. Conversely, in the preparation mode (first operation mode), the ejector rod 210 is arranged at the first retraction position BP1. Thus, the injection molding machine 10 can stably perform the work of replacing the mold unit 800 by avoiding the collision between the ejector rod 210 and the mold unit 800.

Note that the injection molding machine 10 and the control device 700 according to the present embodiment are not limited to the above embodiments and can be modified in various ways. For example, the second retraction position BP2 may be any position where the tip of the ejector rod 210 protrudes further towards the stationary platen 110 side, relative to the tip of the ejector rod 210 arranged at the first retraction position BP1 in the preparation mode, and the second retraction position BP2 may be positioned further in a rearward direction, relative to the front end surface 511. Alternatively, the first retraction position BP1 may be any position where the tip of the ejector rod 210 is separated further away from the stationary platen 110, relative to the tip of the ejector rod 210 arranged at the second retraction position BP2 in the injection molding mode, and the first retraction position BP1 may protrude slightly from the front end surface 511.

The control device 700 may also be configured to automatically move the ejector rod 210 to the first retraction position BP1 when receiving an operation instruction to operate the mold clamping unit 100 while the ejector rod 210 is at the second retraction position BP2 in the preparation mode. For example, as described above, the user performs an operation to press the mold closing operation button 768a when performing work of replacing the mold unit 800 in the preparation mode. When the ejector rod 210 is at the second retraction position BP2, the control device 700 automatically retracts the ejector rod 210 to the first retraction position BP1 based on the operation to press the mold closing operation button 768a. Thus, even if the user forgets to move the ejector rod 210 to the first retraction position BP1, the ejector rod 210 can be smoothly arranged at the first retraction position BP1 when the mold clamping unit 100 is operated for the work of replacing the mold unit 800.

In the preparation mode, the control device 700 may move the ejector rod 210 to the first retraction position BP1 by the push operation of the retraction operation button 769a, and then return the ejector rod 210 to the second retraction position BP2 by another operation. For example, when the control device 700 recognizes the operation of continuously pressing the retraction operation button 769a twice (double click) via the operation device 750, the control device 700 performs a process of returning the ejector rod 210 from the first retraction position BP1 to the second retraction position BP2. Thus, by arranging the ejector rod 210 at the second retraction position BP2 even in the preparation mode, the operation of the ejector rod 210 can be shortened in the work other than the work of replacing the mold unit 800.

Further, in the injection molding mode or the manual mode, the control device 700 may move the ejector rod 210 to the second retraction position BP2 by the push operation of the advancing operation button 769b, and then return the ejector rod 210 to the first retraction position BP1 by another operation. Thus, in the injection molding mode or the manual mode, the ejector rod 210 can be arranged at the first retraction position BP1 to perform various operations. That is, by having the above functions, the injection molding machine 10 can easily change the position of the ejector rod 210 at the user's discretion.

The control device 700 and the injection molding machine 10 according to the embodiment disclosed herein are exemplary in all respects and are not limiting. Embodiments may be modified into various forms on the basis of the spirit of the invention. Additionally, the modifications are included in the scope of the invention. The matters described in the above embodiments may, to the extent that the matters are consistent, be of other configurations and may be combined to the extent that the matters are consistent.

What is claimed is:

1. A control device configured to control an operation of an injection molding machine, the control device comprising:

processing circuitry configured to set a plurality of operation modes including a first operation mode and a second operation mode in which the injection molding machine is operated, the injection molding machine including a stationary platen, a movable platen, a mold unit, a mold clamping unit configured to open and close the mold unit, and an ejector unit attached to the movable platen, the ejector unit including an ejector rod configured to move in the movable platen and advance to eject a molding product from the mold unit, and set, at different positions from each other, a first retraction position to which the ejector rod retracts and at which the ejector rod waits in the first operation mode and a second retraction position to which the ejector rod retracts and at which the ejector rod waits in the second operation mode, the first retraction position and the second retraction position being closer to the stationary platen than a mechanical retraction limit position of the ejector rod, wherein a tip of the ejector rod at the first retraction position is prevented from protruding from a front end surface of the movable platen, the front end surface facing towards the stationary platen.

2. The control device according to claim 1, wherein the second operation mode is a mode in which the injection molding machine performs injection molding, and the second retraction position is a position at which the tip of the ejector rod protrudes further towards the stationary platen, relative to the tip of the ejector rod arranged at the first retraction position in the first operation mode.

3. The control device according to claim 2, wherein the second retraction position is a position at which the tip of the ejector rod is further in a forward direction, relative to the front end surface of the movable platen.

4. The control device according to claim 1, wherein the first operation mode is a mode in which the mold unit is replaced, and the first retraction position is a position at which the tip of the ejector rod is separated further from the stationary platen, relative to the tip of the ejector rod arranged at the second retraction position in the second operation mode.

5. The control device according to claim 4, wherein the processing circuitry is configured to automatically move the ejector rod to the first retraction position, in response to receiving an operation instruction to operate the mold clamping unit when the first operation mode is implemented.

6. The control device according to claim 1, wherein the first operation mode is a mode in which a mold clamping motor of the mold clamping unit is limited, and the first retraction position is a position at which the tip of the ejector rod is separated further from the stationary platen, relative to the tip of the ejector rod arranged at the second retraction position in the second operation mode.

7. The control device according to claim 4, wherein the first retraction position is a position at which the tip of the ejector rod is further in a rearward direction relative to the front end surface of the movable platen, or a position that coincides with the front end surface.

8. The control device according to claim 1, wherein the processing circuitry is configured to prohibit an opening and closing movement by the mold clamping unit, when the ejector rod is not at the first retraction position in the first operating mode.

9. The control device according to claim 1, wherein the processing circuitry is configured to arrange the ejector rod at the second retraction position, in response to receiving an operation instruction different from an operation instruction to retract the ejector rod in the first operation mode.

10. The control device according to claim 1, wherein the tip of the ejector rod at the second retraction position is out of contact with a movable structure of the mold unit, the movable structure being configured to be pushed to eject the molding product from the mold unit, and the processing circuitry is configured to, in the second operation mode, control the ejector unit to advance the ejector rod from the second retraction position so that the tip of the ejector rod directly contacts and pushes the movable structure to eject the molding product from the mold unit.

11. An injection molding machine comprising:

a stationary platen;

a movable platen;

a mold unit;

a mold clamping unit configured to open and close the mold unit;

an ejector unit attached to the movable platen, the ejector unit including an ejector rod configured to move in the movable platen and advance to eject a molding product from the mold unit; and the control device as set forth in claim 1.

12. The control device according to claim 1, wherein the tip of the ejector rod at the first retraction position is in a same plane as the front end surface of the movable platen or positioned inward of the movable platen relative to the front end surface.

13. The control device according to claim 1, wherein the processing circuitry is configured to, in the second operation mode, operate the mold clamping unit to close the mold unit after moving the ejector rod to the second retraction position during a single molding cycle of producing the molding product.

14. A control device configured to control an operation of an injection molding machine, the control device comprising:

processing circuitry configured to set a plurality of operation modes including a first operation mode and a second operation mode in which the injection molding machine is operated, the injection molding machine including a stationary platen, a movable platen, a mold unit, a mold clamping unit configured to open and close the mold unit, and an ejector unit attached to the movable platen, the ejector unit including an ejector rod configured to move in the movable platen and advance to eject a molding product from the mold unit, and set, at different positions from each other, a first retraction position to which the ejector rod retracts and at which the ejector rod waits in the first operation mode and a second retraction position to which the ejector rod retracts and at which the ejector rod waits in the second operation mode, the first retraction position and the second retraction position being closer to the stationary platen than a mechanical retraction limit position of the ejector rod, wherein the processing circuitry is configured to, in the second operation mode, operate the mold clamping unit to close the mold unit after moving the ejector rod to the second retraction position during a single molding cycle of producing the molding product.

15. The control device according to claim 14, wherein a tip of the ejector rod at the second retraction position is out of contact with a movable structure of the mold unit, the movable structure being configured to be pushed to eject the molding product from the mold unit, and the processing circuitry is configured to, in the second operation mode, control the ejector unit to advance the ejector rod from the second retraction position so that the tip of the ejector rod directly contacts and pushes the movable structure to eject the molding product from the mold unit.

16. An injection molding machine comprising:
a stationary platen;
a movable platen;
a mold unit;

a mold clamping unit configured to open and close the mold unit;
an ejector unit attached to the movable platen, the ejector unit including an ejector rod configured to move in the movable platen and advance to eject a molding product from the mold unit; and
the control device as set forth in claim 14.

17. A control device configured to control an operation of an injection molding machine, the control device comprising:

processing circuitry configured to set a plurality of operation modes including a first operation mode and a second operation mode in which the injection molding machine is operated, the injection molding machine including a stationary platen, a movable platen, a mold unit, a mold clamping unit configured to open and close the mold unit, and an ejector unit attached to the movable platen, the ejector unit including an ejector rod configured to move in the movable platen and advance to eject a molding product from the mold unit, and set, at different positions from each other, a first retraction position to which the ejector rod retracts and at which the ejector rod waits in the first operation mode and a second retraction position to which the ejector rod retracts and at which the ejector rod waits in the second operation mode, the first retraction position and the second retraction position being closer to the stationary platen than a mechanical retraction limit position of the ejector rod, wherein a tip of the ejector rod at the second retraction position is out of contact with a movable structure of the mold unit, the movable structure being configured to be pushed to eject the molding product from the mold unit, and the processing circuitry is configured to, in the second operation mode, control the ejector unit to advance the ejector rod from the second retraction position so that the tip of the ejector rod directly contacts and pushes the movable structure to eject the molding product from the mold unit.

18. An injection molding machine comprising:
a stationary platen;
a movable platen;
a mold unit;
a mold clamping unit configured to open and close the mold unit;
an ejector unit attached to the movable platen, the ejector unit including an ejector rod configured to move in the movable platen and advance to eject a molding product from the mold unit; and
the control device as set forth in claim 17.

* * * * *